US009735941B2

(12) United States Patent
Xia et al.

(10) Patent No.: US 9,735,941 B2
(45) Date of Patent: Aug. 15, 2017

(54) INTERFERENCE MEASUREMENT INDICATION METHOD, INTERFERENCE MEASUREMENT METHOD, RELATED DEVICE, AND COMMUNICATION SYSTEM

(71) Applicant: Huawei Technologies Co., Ltd., Shenzhen, Guangdong (CN)

(72) Inventors: Liang Xia, Shenzhen (CN); Yongxing Zhou, Beijing (CN); Jingyuan Sun, Beijing (CN); Mingyu Zhou, Beijing (CN); Xiaotao Ren, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 593 days.

(21) Appl. No.: 14/231,131

(22) Filed: Mar. 31, 2014

(65) Prior Publication Data

US 2014/0211723 A1 Jul. 31, 2014

Related U.S. Application Data

(63) Continuation of application No. PCT/CN2012/082579, filed on Oct. 8, 2012.

(30) Foreign Application Priority Data

Sep. 30, 2011 (CN) .......................... 2011 1 0296342

(51) Int. Cl.
*H04L 5/00* (2006.01)
*H04W 24/02* (2009.01)
*H04L 25/02* (2006.01)

(52) U.S. Cl.
CPC .......... *H04L 5/0053* (2013.01); *H04L 5/0035* (2013.01); *H04L 5/0051* (2013.01);
(Continued)

(58) Field of Classification Search
CPC ..... H04L 5/0007; H04L 5/0023; H04L 5/003; H04L 5/0051; H04L 5/0057; H04L 5/0035; H04L 5/0073; H04L 5/0094; H04L 5/0053; H04L 5/00; H04L 25/0224; H04W 24/02

See application file for complete search history.

(56) References Cited

U.S. PATENT DOCUMENTS

| 2012/0213261 A1* | 8/2012 | Sayana ................. H04L 5/0094 375/224 |
| 2013/0028138 A1 | 1/2013 | Hao et al. |
| 2013/0201971 A1 | 8/2013 | Chen et al. |

FOREIGN PATENT DOCUMENTS

| CN | 101272608 A | 9/2008 |
| CN | 101808409 A | 8/2010 |

(Continued)

OTHER PUBLICATIONS

"Aspects on Distributed RRUs with Shared Cell-ID for Heterogeneous Deployments," 3GPP TSG-RAN WG1 #64, Taipei, Taiwan, R1-110649, 3$^{rd}$ Generation Partnership Project, Valbonne, France (Feb. 21-25, 2011).

(Continued)

*Primary Examiner* — Ian N Moore
*Assistant Examiner* — Brian T Le
(74) *Attorney, Agent, or Firm* — Leydig, Voit & Mayer, Ltd.

(57) ABSTRACT

Embodiments of the present invention disclose an interference measurement indication method, an interference measurement method, a related device, and a communication system. The interference measurement indication method includes: transmitting, by a base station, at least one piece of first-type channel state information reference signal CSI-RS configuration signaling to a user equipment UE, where the at least one piece of first-type CSI-RS configuration signaling indicates a first resource set used for CSI-RS transmission; and transmitting, by the base station, at least one piece of second-type CSI-RS configuration signaling to the UE, (Continued)

where a second resource set used for CSI-RS transmission, which is indicated by the at least one piece of second-type CSI-RS configuration signaling, is a subset of the first resource set. Technical solutions provided by the embodiments of the present invention help improve the flexibility of interference measurement of the UE.

12 Claims, 6 Drawing Sheets

(52) U.S. Cl.
CPC .......... *H04L 5/0094* (2013.01); *H04W 24/02* (2013.01); *H04L 5/005* (2013.01); *H04L 5/0007* (2013.01); *H04L 5/0023* (2013.01); *H04L 5/0057* (2013.01); *H04L 5/0073* (2013.01); *H04L 25/0224* (2013.01)

(56) References Cited

FOREIGN PATENT DOCUMENTS

| | | |
|---|---|---|
| CN | 102075274 A | 5/2011 |
| CN | 102104973 A | 6/2011 |
| EP | 2763325 A2 | 8/2014 |
| WO | WO 2011055986 A2 | 5/2011 |
| WO | WO 2011115421 A2 | 9/2011 |

OTHER PUBLICATIONS

"Considerations on Interference Measurement and its Specification Impact in CoMP," 3GPP TSG RAN WG1 Meeting #66, Athens, Greece, R1-112110, $3^{rd}$ Generation Partnership Project, Valbonne, France (Aug. 22-26, 2011).

"$3^{rd}$ Generation Partnership Project; Technical Specification Group Radio Access Network; Evolved Universal Terrestrial Radio Access (E-UTRA); Physical Channels and Modulation (Release 10)," 3GPP TS 36.211, V10.3.0, pp. 1-103, $3^{rd}$ Generation Partnership Project, Valbonne, France (Sep. 2011).

"$3^{rd}$ Generation Partnership Project; Technical Specification Group Radio Access Network; Evolved Universal Terrestrial Radio Access (E-UTRA); Physical layer procedures (Release 10)," 3GPP TS 36.213, V10.3.0, pp. 1-122, $3^{rd}$ Generation Partnership Project, Valbonne, France (Sep. 2011).

"$3^{rd}$ Generation Partnership Project; Technical Specification Group Radio Access Network; Evolved Universal Terrestrial Radio Access (E-UTRA); Radio Resource Control (RRC); Protocol specification (Release 10)," 3GPP TS 36.331, V10.3.0, pp. 1-296, $3^{rd}$ Generation Partnership Project, Valbonne, France (Sep. 2011).

* cited by examiner

INTERFERENCE MEASUREMENT INDICATION METHOD, INTERFERENCE MEASUREMENT METHOD, RELATED DEVICE, AND COMMUNICATION SYSTEM

CROSS-REFERENCE TO RELATED APPLICATION

This application is a continuation of International Patent Application No. PCT/CN2012/082579, filed on Oct. 8, 2012, which claims priority to Chinese Patent Application No. 201110296342.9, filed on Sep. 30, 2011, both of which are hereby incorporated by reference in their entireties.

TECHNICAL FIELD

The present invention relates to the field of communication technologies, and in particular, to an interference measurement indication method, an interference measurement method, a related device, and a communication system.

BACKGROUND

In a radio communication system, to enable a user equipment (UE, User Equipment) to measure downlink channel state information (CSI, Channel State Information), a base station needs to transmit a reference signal to the user equipment within its coverage area so that the user equipment measures a downlink channel.

For example, as specified in the long term evolution (LTE, Long Term Evolution) R10 protocol defined by the 3rd Generation Partnership Project (3GPP, the 3rd Generation Partnership Project), the base station needs to transmit a channel state information reference signal (CSI-RS, Channel State Information Reference signal) to the UE within its coverage area, so that the UE measures the downlink channel. In this case, the base station further needs to notify position information of the CSI-RS to the UE so that the UE can measure downlink channel state information according to the reference signal in the position.

To achieve a higher user throughput rate, a coordinated multiple point transmission and reception (CoMP, Coordinated Multiple Point transmission and reception) technology may be used in the radio communication system. The coordinated multiple point transmission and reception technology refers to that multiple nodes simultaneously provide data services for one or more users, where the nodes may be, for example, base stations, or remote radio heads (RRH, Remote Radio Head), or radio remote units (RRU, Radio Remote Unit) or antenna units (AU, Antenna Unit), or other types of cell serving nodes. With respect to the coordinated multiple point transmission and reception technology, the base station needs to use channel state information between a terminal and a candidate node and node set as an input or reference to complete processing such as resource allocation and data transmission. When the UE is served by different nodes or different node sets, the degree of interference received by the UE may vary, and the corresponding channel quality indicator (CQI, Channel Quality Indicator) may also vary. When interfering nodes use different transmission schemes (the transmission scheme of an interfering node may be muting, beamforming, transmit diversity, and so on), the degree of interference received by the UE may vary, and the corresponding CQI may also vary.

Referring to FIG. 1, FIG. 1 shows a conventional CoMP scenario, where nodes that may participate in coordinated data transmission are three conventional cells, a UE that accepts a CoMP service may be served by any one or more of the cells, and other cells are interfering cells. In the prior art, it is difficult for the UE to measure interference flexibly. For example, when the UE is served, if there is no downlink data transmission in an interfering cell, a physical downlink shared channel (PDSCH, Physical Downlink Shared Channel) of the interfering cell causes no interference to the UE, but a CRS of the interfering cell still causes interference to the UE. In this case, the UE is required to be capable of measuring interference in different scenarios accurately and flexibly, to obtain different CQIs in different scenarios. In the prior art, it is difficult for the UE to measure interference flexibly when the UE is served by any one or more cells.

SUMMARY

Embodiments of the present invention provide an interference measurement indication method, an interference measurement method, a related device, and a communication system, so as to improve the flexibility of interference measurement of a UE.

To solve the foregoing technical problem, the embodiments of the present invention provide the following technical solutions:

An interference measurement indication method includes:
transmitting, by a base station, at least one piece of first-type channel state information reference signal CSI-RS configuration signaling to a user equipment UE, where the at least one piece of first-type CSI-RS configuration signaling indicates a first resource set used for CSI-RS transmission; and
transmitting, by the base station, at least one piece of second-type CSI-RS configuration signaling to the UE, where a second resource set used for CSI-RS transmission, which is indicated by the at least one piece of second-type CSI-RS configuration signaling, is a subset of the first resource set.

An interference measurement method includes:
receiving, by a user equipment, at least one piece of first-type channel state information reference signal CSI-RS configuration signaling transmitted by a base station, where the at least one piece of first-type CSI-RS configuration signaling indicates a first resource set used for CSI-RS transmission;
receiving, by the user equipment, at least one piece of second-type CSI-RS configuration signaling transmitted by the base station, where a second resource set used for CSI-RS transmission, which is indicated by the at least one piece of second-type CSI-RS configuration signaling, is a subset of the first resource set; and
performing, by the user equipment, an interference measurement in a resource position corresponding to the second resource set.

A base station includes:
a first transmitting module, configured to transmit at least one piece of first-type channel state information reference signal CSI-RS configuration signaling to a user equipment UE, where the at least one piece of first-type CSI-RS configuration signaling indicates a first resource set used for CSI-RS transmission; and
a second transmitting module, configured to transmit at least one piece of second-type CSI-RS configuration signaling to the UE, where a second resource set used for CSI-RS transmission, which is indicated by the at least one piece of second-type CSI-RS configuration signaling, is a subset of the first resource set.

A user equipment includes:

a first receiving module, configured to receive at least one piece of first-type channel state information reference signal CSI-RS configuration signaling transmitted by a base station, where the at least one piece of first-type CSI-RS configuration signaling indicates a first resource set used for CSI-RS transmission;

a second receiving module, configured to receive at least one piece of second-type CSI-RS configuration signaling transmitted by the base station, where a second resource set used for CSI-RS transmission, which is indicated by the at least one piece of second-type CSI-RS configuration signaling, is a subset of the first resource set; and an interference measurement module, configured to perform an interference measurement in a resource position corresponding to the second resource set.

A communication system includes:

the base station and/or the user equipment provided in the foregoing embodiments.

As can be seen from above, in the embodiments of the present invention, a base station transmits at least one piece of first-type CSI-RS configuration signaling and at least one piece of second-type CSI-RS configuration signaling to a user equipment UE, where the at least one piece of first-type CSI-RS configuration signaling indicates a first resource set used for CSI-RS transmission; and a second resource set used for CSI-RS transmission, which is indicated by the at least one piece of second-type CSI-RS configuration signaling, is a subset of the first resource set. Based on this mechanism, resources included in the second resource set can be designed flexibly by the base station according to requirements, so that the UE can perform an interference measurement on a resource in the second resource set to measure interference as required. It can be seen that, the mechanism helps the UE to implement an interference measurement flexibly.

BRIEF DESCRIPTION OF DRAWINGS

To illustrate the technical solutions in the embodiments of the present invention and in the prior art more clearly, the following briefly introduces the accompanying drawings required for describing the embodiments and the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Embodiments of the present invention provide an interference measurement indication method, an interference measurement method, a related device, and a communication system, so as to improve the flexibility of interference measurement of a UE.

The embodiments are hereinafter described in detail respectively.

To make the objectives, features, and advantages of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

An interference measurement indication method according to an embodiment of the present invention may include: transmitting, by a base station, at least one piece of first-type CSI-RS configuration signaling to a user equipment UE, where the at least one piece of first-type CSI-RS configuration signaling indicates a first resource set used for CSI-RS transmission; and transmitting, by the base station, at least one piece of second-type CSI-RS configuration signaling to the UE, where a second resource set used for CSI-RS transmission, which is indicated by the at least one piece of second-type CSI-RS configuration signaling, is a subset of the first resource set.

Figures 1, 2:
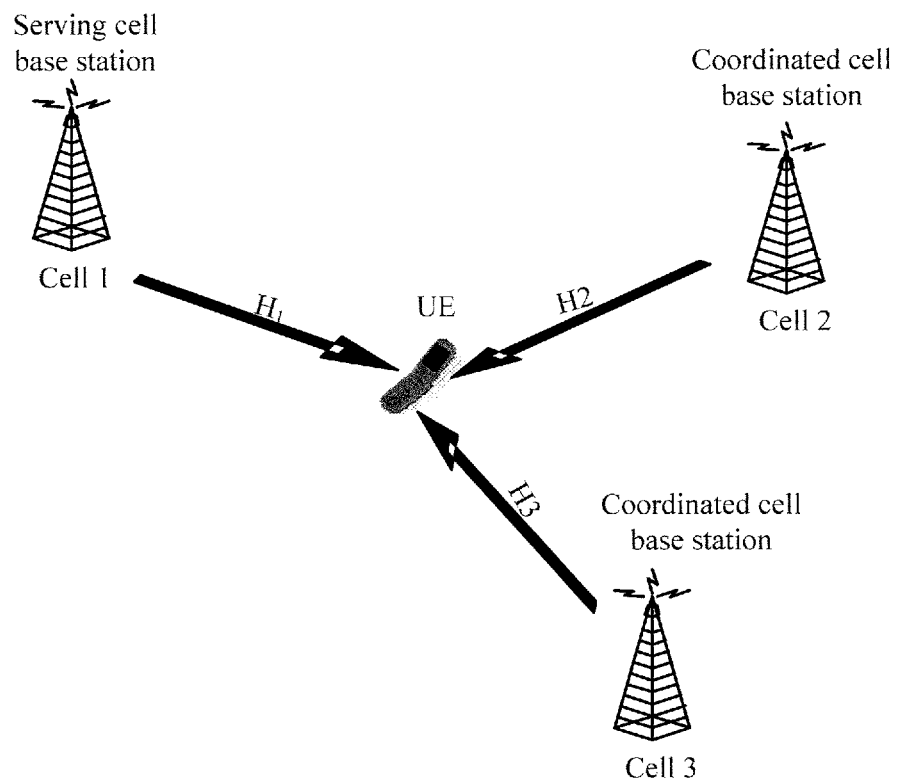
FIG. 1 is a schematic diagram of a CoMP scenario according to the prior art.
FIG. 2 is a schematic flowchart of an interference measurement indication method according to an embodiment of the present invention.

Referring to FIG. 2, an interference measurement indication method may specifically include the following:

201. A base station transmits at least one piece of first-type CSI-RS configuration signaling to a user equipment UE.

The at least one piece of first-type CSI-RS configuration signaling indicates a resource set used for CSI-RS transmission (where for ease of description, this resource set is referred to as a first resource set).

For example, the at least one piece of first-type CSI-RS configuration signaling may indicate time-frequency positions of all resource elements (REs, Resource Elements) used for CSI-RS transmission.

202. The base station transmits at least one piece of second-type CSI-RS configuration signaling to the UE.

A resource set used for CSI-RS transmission, which is indicated by the at least one piece of second-type CSI-RS configuration signaling (where for ease of description, this resource set is referred to as a second resource set), is a subset of the first resource set.

In an application scenario, the second resource set may be a subset of the first resource set in one or more domains. For example, the second resource set is a subset of the first resource set in a space domain; or the second resource set is a subset of the first resource set in a time domain; or the second resource set is a subset of the first resource set in a frequency domain; or the second resource set is a subset of the first resource set in a time-frequency two-dimensional domain; or the second resource set is a subset of the first resource set in a frequency-space two-dimensional domain; or the second resource set is a subset of the first resource set in a time-space two-dimensional domain; or the second resource set is a subset of the first resource set in a time-frequency-space three-dimensional domain.

For example, corresponding to different time and/or different frequencies, the second resource set may be different subsets of the first resource set in a space domain; or corresponding to different space and/or different frequencies, the second resource set may be different subsets of the first resource set in a time domain; or corresponding to different space and/or different time, the second resource set may be different subsets of the first resource set in a frequency domain; or corresponding to different space, the second resource set may be different subsets of the first resource set in a time-frequency two-dimensional domain; or corresponding to different time, the second resource set may be different subsets of the first resource set in a frequency-space two-dimensional domain; or corresponding to different frequencies, the second resource set may be different subsets of the first resource set in a time-space two-dimensional domain.

Correspondingly, the UE may receive the at least one piece of first-type CSI-RS configuration signaling (indicating the first resource set for CSI-RS transmission) transmitted by the base station, receive the at least one piece of second-type CSI-RS configuration signaling (indicating the second resource set used for CSI-RS transmission, which is a subset of the first resource set) transmitted by the base station, and perform an interference measurement in a resource position corresponding to the second resource set.

In actual applications, in order for the UE to quickly distinguish the first-type CSI-RS configuration signaling and second-type CSI-RS configuration signaling, the base station may carry different message type identifiers in the first-type CSI-RS configuration signaling and the second-type CSI-RS configuration signaling, and accordingly the UE may determine, according to a message type identifier carried in the received CSI-RS configuration signaling, whether the message is the first-type CSI-RS configuration signaling or the second-type CSI-RS configuration signaling. Alternatively, the base station may carry a message type identifier in the first-type CSI-RS configuration signaling or the second-type CSI-RS configuration signaling (for example, the base station may carry a message type identifier in the second-type CSI-RS configuration signaling), and in this case, the UE may determine, according to whether the received CSI-RS configuration signaling carries the message type identifier, whether the message is the first-type CSI-RS configuration signaling or the second-type CSI-RS configuration signaling. Definitely, the base station may also not carry a message type identifier in the first-type CSI-RS configuration signaling and/or second-type CSI-RS configuration signaling, and accordingly the UE directly determines, according to relevant information carried in the received CSI-RS configuration signaling, whether the received CSI-RS configuration signaling is the first-type CSI-RS configuration signaling or the second-type CSI-RS configuration signaling.

In actual applications, the second-type CSI-RS configuration signaling may include, for example, spacing information and/or offset information of resources in the second resource set relative to resources in the first resource set; or the second-type CSI-RS configuration signaling includes a configuration bitmap, where each bit in the configuration bitmap is in one-to-one correspondence to each resource or resource set that may belong to the second resource set. Definitely, the CSI-RS configuration signaling may also carry, for example, other indication information, so that the UE may determine the second resource set according to a combination of the received first-type CSI-RS configuration signaling and second-type CSI-RS configuration signaling. Definitely, the at least one piece of second-type CSI-RS configuration signaling may also independently indicate the second resource set, so that the UE may directly determine the second resource set according to the second-type CSI-RS configuration signaling.

In addition, a node to be measured may further transmit a CSI-RS (for example, transmit a zero-power CSI-RS or a non-zero-power CSI-RS) on a resource in the first resource set; and an interfering node may further transmit an interference signal on a resource in the second resource set. Further, the interfering node may notify that a resource element for transmitting the interference signal is a zero-power resource element, to a UE that may be served by the interfering node, so that the UE that may be served by the interfering node is further instructed not to receive data in a resource element position in which the interference signal is transmitted.

As can be seen from above, in the embodiment of the present invention, a base station transmits at least one piece of first-type CSI-RS configuration signaling and at least one piece of second-type CSI-RS configuration signaling to a user equipment UE, where the at least one piece of first-type CSI-RS configuration signaling indicates a first resource set used for CSI-RS transmission; and a second resource set used for CSI-RS transmission, which is indicated by the at least one piece of second-type CSI-RS configuration signaling, is a subset of the first resource set. Based on this mechanism, resources included in the second resource set can be designed flexibly by the base station according to requirements, so that the UE can perform an interference measurement on a resource in the second resource set to measure interference as required. It can be seen that, the mechanism helps the UE to implement an interference measurement flexibly.

An interference measurement method according to an embodiment of the present invention may include: receiving, by a UE, at least one piece of first-type CSI-RS configuration signaling transmitted by a base station, where the at least one piece of first-type CSI-RS configuration signaling indicates a first resource set used for CSI-RS transmission; receiving, by the UE, at least one piece of second-type CSI-RS configuration signaling transmitted by the base station, where a second resource set used for CSI-RS transmission, which is indicated by the at least one piece of second-type CSI-RS configuration signaling, is a subset of the first resource set; and performing, by the UE, an interference measurement in a resource position corresponding to the second resource set.

Figure 3:
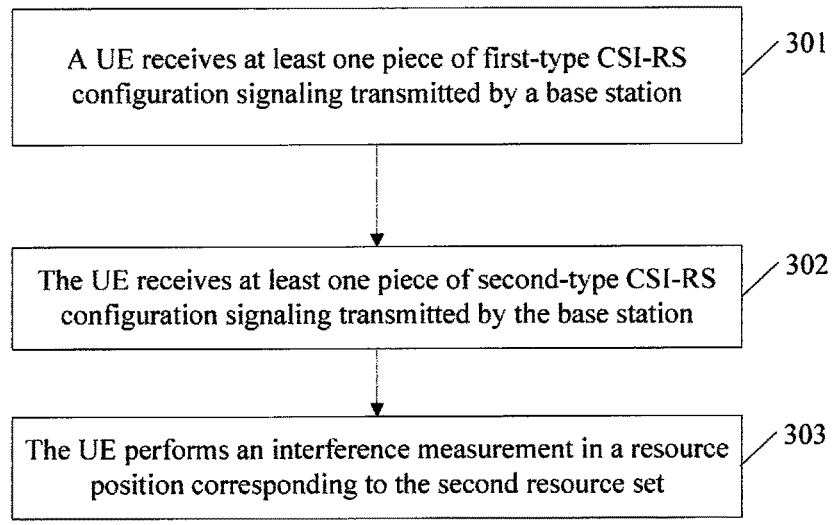
FIG. 3 is a schematic flowchart of an interference measurement method according to an embodiment of the present invention.

Referring to FIG. 3, an interference measurement method may specifically include the following:

301. A UE receives at least one piece of first-type CSI-RS configuration signaling transmitted by a base station.

The at least one piece of first-type CSI-RS configuration signaling indicates a first resource set used for CSI-RS transmission.

302. The UE receives at least one piece of second-type CSI-RS configuration signaling transmitted by the base station.

A second resource set used for CSI-RS transmission, which is indicated by the at least one piece of second-type CSI-RS configuration signaling, is a subset of the first resource set.

303. The UE performs an interference measurement in a resource position corresponding to the second resource set.

Further, the user equipment further performs a channel measurement in a resource position corresponding to the first resource set or a third resource set, where the third resource set may be, for example, a complementary set of the second resource set in the first resource set, or the third resource set may be a subset of the first resource set and the third resource set and the second resource set have an intersection or do not have an intersection (where in this case, the base station may indicate, for example, the third resource set by using at least one piece of third-type CSI-RS configuration signaling); and calculates a CQI according to a result of the interference measurement and a result of the channel measurement, and feed backs the calculated CQI to the base station.

In an application scenario, the UE may respectively perform an interference measurement, for example, on the second resource set used for CSI-RS transmission, which is indicated by any one or more pieces of second-type CSI-RS configuration signaling in the at least one piece of second-type CSI-RS configuration signaling, and may respectively calculate a CQI corresponding to each piece of second-type CSI-RS configuration signaling or each second resource set, and feed back one or more CQIs to the base station. In addition, the UE may report a number of the second-type CSI-RS configuration signaling or a number of the second resource set corresponding to the reported CQI to the base station.

As can be seen from above, in the embodiment, a base station transmits at least one piece of first-type CSI-RS configuration signaling and at least one piece of second-type CSI-RS configuration signaling to a user equipment UE, where the at least one piece of first-type CSI-RS configuration signaling indicates a first resource set used for CSI-RS transmission; and a second resource set used for CSI-RS transmission, which is indicated by the at least one piece of second-type CSI-RS configuration signaling, is a subset of the first resource set; and the UE may perform an interference measurement on a resource in the second resource set. Based on this mechanism, resources included in the second resource set can be designed flexibly by the base station according to requirements, so that the UE can perform an interference measurement on a resource in the second resource set to measure interference as required. It can be seen that, the mechanism helps the UE to implement an interference measurement flexibly.

For better understanding and implementing the technical solutions of the embodiments of the present invention, the following uses several specific application scenarios as examples for description.

Figure 4:
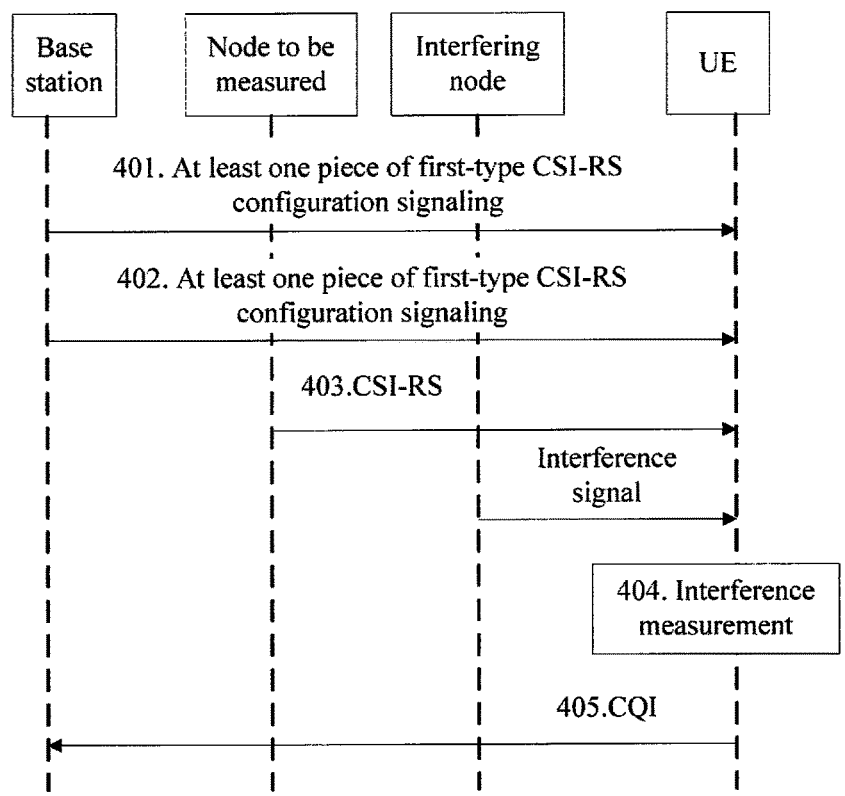
FIG. 4 is a schematic flowchart of another interference measurement method according to an embodiment of the present invention.

Referring to FIG. 4, an interference measurement control method according to an embodiment of the present invention may include the following:

401. A base station transmits at least one piece of first-type CSI-RS configuration signaling to a UE.

The at least one piece of first-type CSI-RS configuration signaling may indicate, for example, time-frequency positions of all resource elements REs used for transmitting a non-zero-power CSI-RS, that is, may indicate time-frequency positions of all REs in a first resource set used for transmitting a non-zero-power CSI-RS.

In an application scenario, the first-type CSI-RS configuration signaling may include, for example, an indication of the number of ports corresponding to the non-zero-power CSI-RS, a pilot pattern indication, and a period and subframe offset indication. The value range for the number of the ports corresponding to the non-zero-power CSI-RS may be, for example, {1, 2, 4, 8}, for example, signaling of 2 bits (or signaling of more bits) may be used to indicate the number of ports corresponding to the CSI-RS; the pilot pattern corresponding to the non-zero-power CSI-RS indicates positions corresponding to REs used for CSI-RS transmission in the subframe for transmitting the non-zero-power CSI-RS; if there are at most 32 configurations, signaling of 5 bits (or signaling of more bits), for example, may be used to indicate the pilot pattern corresponding to the non-zero-power CSI-RS; the period and subframe offset corresponding to the non-zero-power CSI-RS are a period and subframe offset of the subframe for transmitting the non-zero-power CSI-RS; if there are at most 155 configurations, signaling of 8 bits (or signaling of more bits), for example, may be used to indicate the period and subframe offset corresponding to the non-zero-power CSI-RS.

Figure 5:
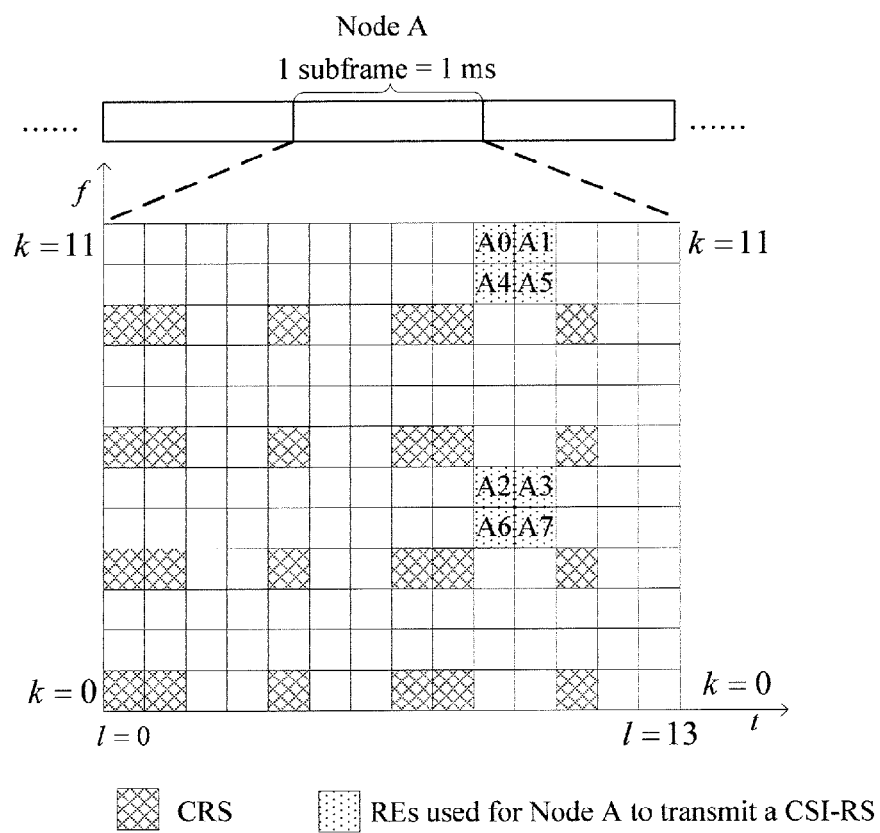
FIG. 5 is a schematic diagram of an 8-port CSI-RS pilot pattern according to an embodiment of the present invention.

Referring to FIG. 5, the following briefly describes all patterns of an 8-port CSI-RS pilot through an example where each node has 8 antenna ports; in the LTE R10 protocol, it is defined that the CSI-RS has multiple pilot patterns and may have a high reuse factor. As shown in FIG. 5, an RE identified by each legend represents an 8-port CSI-RS pilot pattern (8 patterns in total). A 4-port pilot pattern is a half of an 8-port pilot pattern, for example, {0, 1, 2, 3} and {4, 5, 6, 7} in an 8-port pilot pattern are respectively a 4-port pilot pattern; a 2-port pilot pattern is a half of a 4-port pilot pattern, for example, {0, 1} and {2, 3} in a 4-port pilot pattern are respectively a 2-port pilot pattern; a 1-port pilot pattern is the same as a 2-port pilot pattern. In FIG. 5, an ordinary cyclic prefix (CP, Cyclic Prefix) is used as an example for description; definitely, an extended cyclic prefix (extended CP) may also be used according to requirements.

In an actual application, when the base station transmits multiple pieces of first-type CSI-RS configuration signaling to the UE, each piece of first-type CSI-RS configuration signaling indicates a non-zero-power CSI-RS resource configuration of a node or a node set or an antenna cluster. Definitely, one piece of first-type CSI-RS configuration signaling may also indicate non-zero-power CSI-RS resource configurations of multiple nodes or multiple node sets or multiple antenna clusters, or, multiple pieces of first-type CSI-RS configuration signaling may also jointly indicate a non-zero-power CSI-RS resource configuration of at least one node or at least one node set or at least one antenna cluster.

In another application scenario, the first-type CSI-RS configuration signaling may further indicate time-frequency positions of all resource elements (RE) used for transmitting a zero-power CSI-RS. The first-type CSI-RS configuration signaling may carry a zero-power CSI-RS bitmap and a period and subframe offset corresponding to the zero-power CSI-RS. The zero-power CSI-RS bitmap is used to indicate positions of REs used for transmitting a zero-power CSI-RS, in a resource block in a subframe for transmitting the zero-power CSI-RS, for example, signaling of 16 bits (or signaling of more bits) may be used to indicate the positions; the period and subframe offset corresponding to the zero-power CSI-RS is a period and subframe offset of the subframe for transmitting the zero-power CSI-RS; if there are at most 155 configurations, signaling of 8 bits (or signaling of more bits), for example, may be used to indicate the period and subframe offset corresponding to the zero-power CSI-RS.

Figure 6:
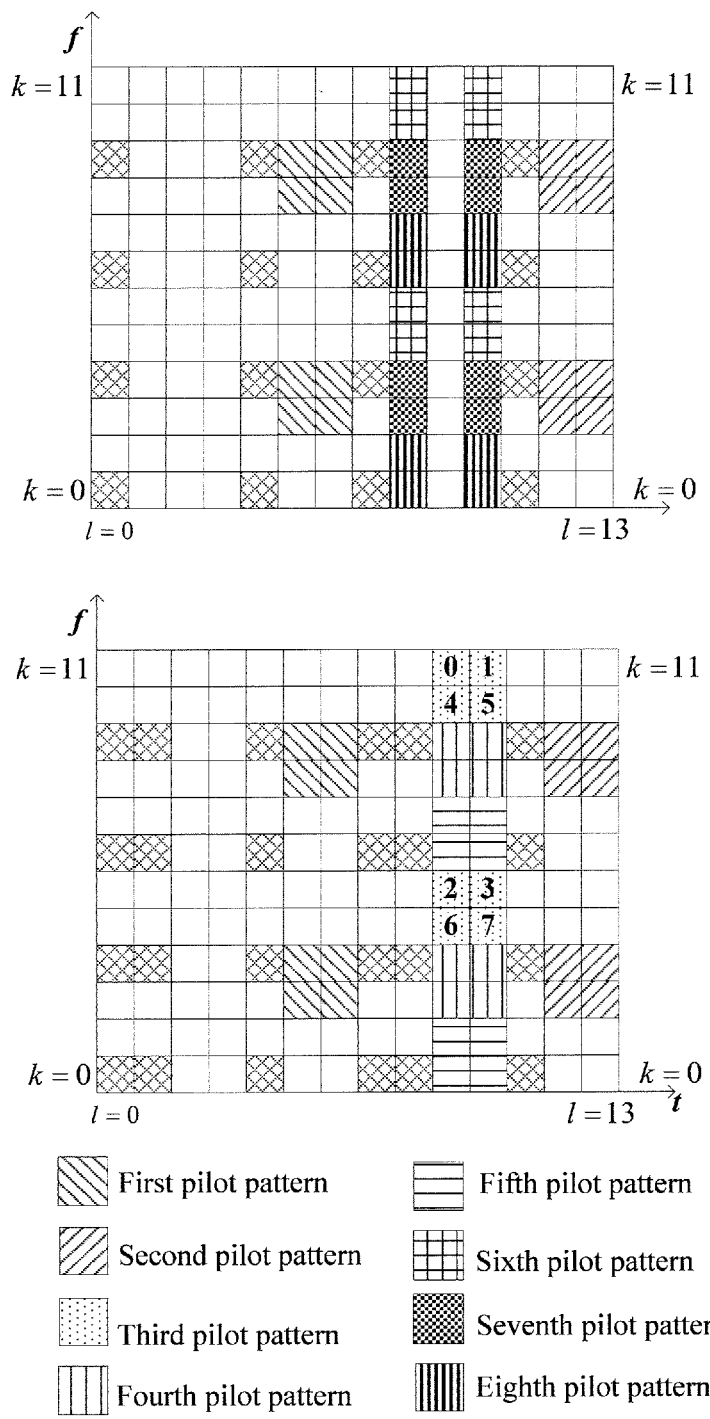
FIG. 6 is a schematic diagram of pilot patterns indicated by first-type CSI-RS configuration signaling according to an embodiment of the present invention.

It is assumed that in step 401, the base station transmits a piece of first-type CSI-RS configuration signaling to the UE, where the first-type CSI-RS configuration signaling indicates the number of ports (such as 8) corresponding to the CSI-RS, and the subframe where REs used for transmitting the CSI-RS are located is a subframe that meets $(n_{sf}-\Delta_{CSI-RS})$ mod $T_{CSI-RS}=0$. In the formula, $n_{sf}$ is a subframe number; $\Delta_{CSI-RS}$ is a subframe offset of the subframe used for transmitting the CSI-RS, and is generally assumed to be 0 in this embodiment; $T_{CSI-RS}$ is a period corresponding to the subframe used for transmitting the CSI-RS, and is generally assumed to be 5 in this embodiment. In this case, the first-type CSI-RS configuration signaling indicates the distribution positions of the REs used for CSI-RS transmission in the corresponding subframe, as shown in FIG. 6.

402. The base station transmits one or more pieces of second-type CSI-RS configuration signaling to the UE.

The one or more pieces of second-type CSI-RS configuration signaling may indicate a time position and/or frequency position and/or port configuration and so on for transmitting CSI-RS, that is, may indicate time-frequency positions of all REs in a second resource set used for CSI-RS transmission.

The second resource set may be a subset of the first resource set in a time domain, a frequency domain, a space domain, a time-frequency two-dimensional domain (namely, time domain+frequency domain), a time-space two-dimensional domain (namely, time domain+space domain), a frequency-space two-dimensional domain (namely, frequency domain+space domain), or a time-frequency-space three-dimensional domain (namely, time domain+frequency domain+space domain).

The following describes, through examples, the scenarios where the second resource set is a subset of the first resource set in one or more domains.

A. Assuming that the second resource set is a subset of the first resource set in the time domain Herein, for example, the time domain is described by taking a subframe as an example, and resources in the second resource set are distributed in a part of subframes corresponding to the first resource set (where assuming that the resources in the first resource set are distributed in five subframes, the second resource set may include resources in the first resource set which are distributed in at least one of the five subframes).

For example, the second-type CSI-RS configuration signaling transmitted by the base station to the UE may carry an indication of positions of the subframes where the resources in the second resource set are distributed. The positions of the subframes where the resources in the second resource set are distributed may be indicated, for example, by any one of the following methods:

A.1. The subframes where the resources in the second resource set are distributed are subframes meeting the following formula: $(n_{sf}-\Delta_{CSI-RS}-Q \cdot T_{CSI-RS})$ mod $(P \cdot T_{CSI-RS})=0$, where: $n_{sf}$ is a subframe number; $\Delta_{CSI-RS}$ is a subframe offset; $T_{CSI-RS}$ is a period of the subframes where the resources in the first resource set are distributed; P is a period of the subframes where the resources in the second resource set are distributed, indicating that in every P subframes where the resources in the first resource set are distributed, there is one subframe where the resources in the second resource set are distributed; Q is a subframe offset, indicating that the resources in the second resource set are distributed in the $Q^{th}$ subframe where the resources in the first resource set are distributed in the period P of the subframes where the resources in the second resource set are distributed, where P is a positive integer, and the value of Q is $\{0, 1, \ldots, P-1\}$. The base station may perform joint encoding for P and Q, and notify the joint encoding result of P and Q to the UE (through second-type CSI-RS configuration signaling); or may fix Q to 0 or other values (that is, Q is the default value), and notify only P to the UE (through second-type CSI-RS configuration signaling); or may fix P to a constant (that is, P is a default value), and notify only Q to the UE (through second-type CSI-RS configuration signaling); or may perform joint encoding for $\Delta_{CSI-RS}-Q \cdot T_{CSI-RS}$ and $P \cdot T_{CSI-RS}$, and notify the joint encoding result of $\Delta_{CSI-RS}-Q \cdot T_{CSI-RS}$ and $P \cdot T_{CSI-RS}$ to the UE (through second-type CSI-RS configuration signaling). The UE may determine time-frequency positions of all REs in the second resource set according to the configuration information carried in the first-type CSI-RS configuration signaling and the configuration information carried in the second-type CSI-RS configuration signaling.

A.2. A configuration bitmap (bitmap) is used to indicate the positions of the subframes where the resources in the second resource set are distributed.

Each bit in the configuration bitmap may be in one-to-one correspondence to each subframe or subframe set where the resources in the second resource set may be distributed. For example, a bit set to "1" (or set to "0"), in the configuration bitmap indicates that the resources in the second resource set are distributed in the subframes where the resources in the first resource set are distributed, in the subframes or subframe sets corresponding to the bit, while a bit set to "0" or (set to "1") indicates that the resources in the second resource set are not distributed in the subframes where the resources in the first resource set are distributed, in the subframes or subframe sets corresponding to the bit.

For example, based on the assumption in step 401, assuming that the period of the subframes where the resources in the first resource set are distributed are five subframes and that the subframe offset is 0, that is, the resources in the first resource set are distributed in subframes numbered $\{0, 5, 10, 15, 20, 25 \ldots\}$, if each bit in the configuration bitmap is in one-to-one correspondence to every five adjacent subframes, assuming that the bitmap is set to (101001 . . . ), it indicates that the resources in the second resource set are distributed in the subframes numbered $\{0, 10, 25 \ldots\}$; if each bit in the configuration bitmap is in one-to-one correspondence to every 10 adjacent subframes, assuming that the configuration bitmap is set to (101 . . . ), it indicates that the resources in the second resource set are distributed in the subframes numbered $\{0, 5, 20, 25 \ldots\}$, and so on.

The length of the configuration bitmap may be M bits; in this case, assuming that each bit in the configuration bitmap is in one-to-one correspondence to every five adjacent subframes, the period of the subframes where the resources in the second resource set are distributed, which is indicated by the configuration bitmap of the M bits, may be up to 5*M subframes. Further, the length of the configuration bitmap may be M/N1 bits; in this case, if each bit is in one-to-one correspondence to every five adjacent subframes, the period of the subframes where the resources in the second resource set are distributed, which is indicated by the configuration bitmap of the M/N1 bits, may be up to 5*M/N1 subframes, where M/N1 is a positive integer, in which case the overheads are relatively low. Further, the length of the configuration bitmap may be M/N2 bits; in this case, assuming that each bit is in one-to-one correspondence to every 5*N2 adjacent subframes, the period of the subframes where the resources in the second resource set are distributed, which is indicated by the configuration bitmap of the M/N2 bits, may be up to 5*M subframes, in which case the overheads are relatively low. Further, K values may be selected from all possible values of the configuration bitmap as K optional values of the bitmap, and in this case, the base station may notify one of the K configuration bitmaps to the UE (through second-type CSI-RS configuration signaling). If the value of the period of the subframes where the resources in the first resource set are distributed is {5, 10, 20, 40, 80}, the preferred length of the configuration bitmap may be 16 bits; each bit is in one-to-one correspondence to every five adjacent subframes, and in this case, the positions of the subframes where the resources in the second resource set are distributed may be configured flexibly. Another optional solution is that: for example, three nodes may participate in coordinated transmission, and the UE may be served by any one or more of the three nodes; in the nodes except the node to be measured, two or either thereof may be an interfering node or neither thereof is an interfering node; therefore, there are four possibilities for the interfering node; in this case, the length of the configuration bitmap may be four bits, each of which is in one-to-one correspondence to $T_{CSI-RS}$ (namely, the period of the subframes where the resources in the first resource set are distributed) adjacent subframes; or if, in this case, the length of the configuration bitmap is 16 bits, each of which is in one-to-one correspondence to five adjacent subframes, values of the configuration bitmap have four possibilities (K=4), where the value of each bitmap may correspond to each possible interfering node, and the base station may notify one of the four possible configuration bitmaps to the UE (through second-type CSI-RS configuration signaling).

The UE may determine time-frequency positions of all REs in the second resource set according to the configuration information carried in the first-type CSI-RS configuration signaling and the configuration information (including the configuration bitmap) carried in the second-type CSI-RS configuration signaling.

B. Assuming that the second resource set is a subset of the first resource set in the frequency domain In this scenario, for example, a resource block (RB, Resource Block) is used as a mode of description of the frequency domain, and resources in the second resource set are distributed in a part of RBs corresponding to the first resource set.

The second-type CSI-RS configuration signaling transmitted by the base station to the UE may carry an indication of the positions of the RBs where the resources in the second resource set are distributed. The positions of the RBs where the resources in the second resource set are distributed may be indicated, for example, by any one of the following methods:

B.1. The RBs or RB sets where the resources in the second resource set are distributed are RBs or RB sets meeting the following formula: $(n_{RB}-Q) \mod P=0$, where: $n_{RB}$ is an RB number or an RB set number, and one RB set includes multiple RBs; P indicates that in every P RBs or RB sets where the resources in the first resource set are distributed, there is one RB or RB set where the resources in the second resource set are distributed; Q indicates that the resources in the second resource set are distributed in the $Q^{th}$ RB or RB set in the P RBs or RB sets where the resources in the first resource set are distributed, where P is a positive integer, and the value of Q is {0, 1, . . . , P−1}. The base station may perform joint encoding for P and Q, and notify the joint encoding result of P and Q to the UE (through second-type CSI-RS configuration signaling); or may fix Q to 0 or other values (that is, Q is the default value), and notify only P to the UE; or may fix P to a constant (that is, P is a default value), and notify only Q to the UE (through second-type CSI-RS configuration signaling). The UE may determine time-frequency positions of all RBs in the second resource set according to the configuration information carried in the first-type CSI-RS configuration signaling and the configuration information carried in the second-type CSI-RS configuration signaling.

B.2. A configuration bitmap (bitmap) is used to indicate the positions of the RBs where the resources in the second resource set are distributed.

Each bit in the configuration bitmap may be, for example, in one-to-one correspondence to each RB or RB set where the resources in the second resource set may be distributed, For example, a bit set to "1" (or set to "0"), in the configuration bitmap indicates that the resources in the second resource set are distributed in the RBs where the resources in the first resource set are distributed, in the RBs or RB sets corresponding to the bit, or conversely, a bit set to "0" or (set to "1") indicates that the resources in the second resource set are not distributed in the RBs where the resources in the first resource set are distributed, in the RBs or RB sets corresponding to the bit.

Assuming that resources in the first resource set are distributed in all RBs, if each bit in the configuration bitmap is in one-to-one correspondence to every N1 adjacent RBs, assuming that the configuration bitmap is set to (101 . . . ), and N1=3, resources in the second resource set are distributed in RBs numbered {0, 1, 2, 6, 7, 8, . . . }; if the $i^{th}$ bit in the configuration bitmap is in one-to-one correspondence to the RB meeting $(n_{RB}-i) \mod N2=0$, where $n_{RB}$ is an RB number and N2 is a positive integer, assuming that the bitmap is set to (101 . . . ), and N2=10, it indicates that resources in the second resource set are distributed in RBs numbered {0, 2, . . . , 10, 12, . . . , 20, 22, . . . }; if each bit in the configuration bitmap is in one-to-one correspondence to the $N3^{th}$ RB in every N1 adjacent RBs, assuming that the configuration bitmap is set to (101 . . . ), N1=3, and N3=0, it indicates that the resources in the second resource set are distributed in the RBs numbered {0, 6, . . . }. In this case, the base station may fix N3 (that is, N3 is a default value), and notify the configuration bitmap to the UE (through second-type CSI-RS configuration signaling), or notify both the configuration bitmap and N3 to the UE (through second-type CSI-RS configuration signaling). The length of the configuration bitmap may be M bits; in this case, each bit is in one-to-one correspondence to N predefined RBs, and the frequency bandwidth of the resources in the second resource set, which is indicated by the configuration bitmap, may be up to M*N RBs. Further, K values may be selected from all $2^M$ possible values of the configuration bitmap as K optional values of the configuration bitmap, and in this case, the base station may notify one of the K configuration bitmaps to the UE (through second-type CSI-RS configuration signaling). An optional solution is that: for example, three nodes may participate in coordinated transmission, and the UE may be served by any one or more of the three nodes; in the nodes except the node to be measured, two or either thereof may be an interfering node or neither thereof is an interfering node; therefore, there are four possibilities for the interfering node; in this case, the length of the configuration bitmap may be four bits, where the $i^{th}$ bit is in one-to-one correspondence to the RB meeting $(n_{RB}-i) \bmod 4=0$; or in this case, the length of the configuration bitmap may be M bits, each of which may be in one-to-one correspondence to each RB, values of the configuration bitmap have four possibilities (K=4), where the value of each bitmap may correspond to each possible interfering node, and the base station may notify one of the four possible configuration bitmaps to the UE (through second-type CSI-RS configuration signaling).

The UE may determine time-frequency positions of all RBs in the second resource set according to the configuration information carried in the first-type CSI-RS configuration signaling and the configuration information (including the configuration bitmap) carried in the second-type CSI-RS configuration signaling.

C. Assuming that the second resource set is a subset of the first resource set in the space domain Herein, for example, an antenna port is used as a mode of description of the space domain, and antenna ports corresponding to resources in the second resource set are a part of antenna ports corresponding to the first resource set. REs in the CSI-RS pilot pattern or spreading codes used by different antenna ports are different. Specifically, the RE in the CSI-RS pilot pattern, or the RE in the first resource set in one subframe and one RB may also be used as a mode of description of the space domain, and the implementation manner is similar to the implementation manner corresponding to the antenna port, and is not further described herein.

The second-type CSI-RS configuration signaling transmitted by the base station to the UE may carry a position of an antenna port corresponding to the resource in the second resource set. The position of the antenna port corresponding to the resource in the second resource set may be indicated by any one of the following methods:

C.1. The antenna port corresponding to the resource in the second resource set is an antenna port meeting the following formula: $(n_{port}-Q) \bmod P=0$, where: $n_{port}$ is an antenna port number or an antenna port set number, and an antenna port set may include multiple antenna ports; P indicates that in every P antenna ports or antenna port sets corresponding to resources in the first resource set, there is one antenna port or antenna port set corresponding to the resources in the second resource set; Q indicates that the $Q^{th}$ antenna port or antenna port set in P antenna ports or antenna port sets corresponding to the resources in the first resource set is an antenna port or antenna port set corresponding to the resources in the second resource set. P is a positive integer, and the value of Q is $\{0, 1, \ldots, P-1\}$. The base station may perform joint encoding for P and Q, and notify the joint encoding result of P and Q to the UE (through second-type CSI-RS configuration signaling); or may fix Q to 0 or other values (that is, Q is the default value), and notify only P to the UE; or may fix P to a constant (that is, P is a default value), and notify only Q to the UE (through second-type CSI-RS configuration signaling). As can be seen from FIG. 4, RE positions corresponding to two adjacent ports are the same. Therefore, $n_{port}$ may be the number of the antenna port set corresponding to same REs. For example, $n_{port}$ corresponding to antenna ports 0 and 1 may be 0, and $n_{port}$ corresponding to antenna port 2 and antenna port 3 may be 1, and so on.

C.2. A configuration bitmap is used to indicate the position of the antenna port corresponding to the resources in the second resource set.

Each bit in the configuration bitmap may be in one-to-one correspondence to each possible antenna port or antenna port set corresponding to the resources in the second resource set.

For example, a bit set to "1" or (set to "0") in the configuration bitmap indicates that the antenna port or antenna port set corresponding to the bit corresponds to the resources in the second resource set and corresponds to the resources in the first resource set. Conversely, a bit set to "0" or (set to "1") indicates that the antenna port or antenna port set corresponding to the bit corresponds to the resources in the first resource set but does not correspond to the resources in the second resource set.

Specifically, assuming that the REs in the first resource set are shown in FIG. 3, if each bit in the configuration bitmap corresponds to every N1 REs that are adjacent with respect to time, assuming that the configuration bitmap is set to (1010), and N1=2, it indicates that the REs numbered {A0, A1, A4, A5} are resources in the second resource set; if the $i^{th}$ bit in the configuration bitmap corresponds to the antenna port meeting $(n_{port}-i) \bmod N2=0$, where $n_{port}$ is an antenna port number and N2 is a positive integer, assuming that the configuration bitmap is set to (1010), and N2=4, it indicates that REs numbered {A0, A2, A4, A6} are resources in the second resource set; if each bit in the configuration bitmap corresponds to the $N3^{th}$ RE in every N1 adjacent REs, assuming that the configuration bitmap is set to (1010), N1=3, and N3=0, it indicates that REs numbered {A0, A4} are resources in the second resource set. In this case, the base station may fix N3 (that is, N3 is a default value), and notify the configuration bitmap to the UE (through second-type CSI-RS configuration signaling), or notify both the configuration bitmap and N3 to the UE (through second-type CSI-RS configuration signaling). The length of the configuration bitmap may be M bits; in this case, if each bit is in one-to-one correspondence to N predefined REs, resources in the second resource set indicated by the configuration bitmap may be up to M*N REs. Further, K values may be selected from all $2^M$ possible values of the configuration bitmap as K optional values of the configuration bitmap, and in this case, the base station may notify one of the K configuration bitmaps to the UE (through second-type CSI-RS configuration signaling). An optional solution is that: for example, three nodes may participate in coordinated transmission, and the UE may be served by any one or more of the three nodes; in the nodes except the node to be measured, two or either thereof may be an interfering node or neither thereof is an interfering node; therefore, there are four possibilities for the interfering node; in this case, the length of the configuration bitmap may be four bits, where the $i^{th}$ bit is in one-to-one correspondence to the antenna port set meeting $(n_{port}-i) \bmod 4=0$ or in this case, the length of the bitmap may be M bits, each of which corresponds to each antenna port, values of the configuration bitmap have four possibilities (K=4), where the value of each configuration bitmap may correspond to each possible interfering node, and the base station may notify one of the four possible configuration bitmaps to the UE (through second-type CSI-RS configuration signaling). Another optional solution is that: the length of the configuration bitmap may be 16 bits, where the RE corresponding to each bit is the same as the RE corresponding to each 4-port non-zero-power CSI-RS pattern; or the length of the configuration bitmap may be 32 bits, where the RE corresponding to each bit is the same as the RE corresponding to each 2-port non-zero-power CSI-RS pattern; or the length of the configuration bitmap may be 8 bits, where the RE corresponding to each bit is the same as the RE corresponding to each 8-port non-zero-power CSI-RS pattern; or the length of the configuration bitmap may be 64 bits, where the RE corresponding to each bit is the same as each RE that may transmit the CSI-RS; or the length of the configuration bitmap may be 52 bits, where the RE corresponding to each bit is the same as each RE that may transmit the CSI-RS, and the 52 bits may be the 36 REs on the eighth, ninth, and tenth OFDM symbols and 16 REs on the fifth, sixth, twelfth, and thirteenth OFDM symbols in FIG. 5.

The UE may determine time-frequency positions of all REs in the second resource set according to the configuration information carried in the first-type CSI-RS configuration signaling and the configuration information (including the configuration bitmap) carried in the second-type CSI-RS configuration signaling.

D. Assuming that the second resource set is a subset of the first resource set in the frequency-space two-dimensional domain In this scenario, for example, an RB is used as a mode of description of the frequency domain, an antenna port is used as a mode of description of the space domain, and a 2-tuple of RBs (or RB sets) and antenna ports (or antenna port sets) may be used as a mode of description of the frequency-space two-dimensional domain.

Resources in the second resource set are distributed on a part of RBs corresponding to the first resource set, and antenna ports corresponding to the resources in the second resource set are a part of antenna ports corresponding to the first resource set; or antenna ports corresponding to different RBs (or different RB sets) and corresponding to the resources in the second resource set are different subsets of the antenna ports corresponding to the resources in the first resource set, or RBs where resources in the second resource set are distributed, corresponding to different antenna ports (or different antenna port sets), are different subsets of RBs where resources in the first resource set are distributed.

The second-type CSI-RS configuration signaling transmitted by the base station to the UE may carry an indication of the positions of the RBs where resources in the second resource set are distributed and an indication of the positions of the antenna ports corresponding to the resources in the second resource set. The positions of the RBs where resources in the second resource set are distributed and positions of antenna ports corresponding to the resources in the second resource set may be indicated in any one of the following modes:

Mode D.1

For example, mode B.1 or B. 2 may be used to indicate the positions of the RBs where resources in the second resource set are distributed, and mode C. 1 or C. 2 may be used to indicate the positions of the antenna ports corresponding to the resources in the second resource set.

Mode D.2

The RBs (or RB sets) where the resources in the second resource set are distributed and the antenna ports (or antenna port sets) corresponding to the resources in the second resource set meet the following formula:

$$(n_{RB\_port} - Q) \mod P = 0,$$

where $n_{RB\_port}$ is a joint number of the 2-tuple of RBs (or RB sets) and antenna ports (or antenna port sets), $$n_{RB\_port} = n_{RB} \times N_{port} + n_{port}, \text{ or}$$

$$n_{RB\_port} = n_{port} \times N_{RB} + n_{RB},$$

where: $N_{port}$ is the total number of antenna ports or antenna port sets, $N_{RB}$ is the total number of RBs or RB sets, $n_{RB}$ is an RB number or an RB set number, and $n_{port}$ is an antenna port number or an antenna port set number, where one RB set includes multiple RBs and one antenna port set may include multiple antenna ports. P indicates that in every P 2-tuples of RBs (or RB sets) where the resources in the first resource set are distributed and antenna ports (antenna port sets) are distributed, there is one 2-tuple of RBs (or RB sets) and antenna ports (or antenna port sets) where the resources in the second resource set are distributed; Q indicates that the resources in the second resource set are distributed in the $Q^{th}$ 2-tuple of RBs (or RB sets) and antenna ports (or antenna port sets), in P 2-tuples of RBs (or RB sets) and antenna ports (or antenna port sets) where the resources in the first resource set are distributed, where P is a positive integer and the value of Q is $\{0, 1, \ldots P-1\}$. The base station may perform joint encoding for P and Q, and notify the joint encoding result of P and Q to the UE (through second-type CSI-RS configuration signaling); or may fix Q to 0 or other values (that is, Q is the default value), and notify only P to the UE; or may fix P to a constant (that is, P is a default value), and notify only Q to the UE (through second-type CSI-RS configuration signaling). The UE may determine time-frequency positions of all REs in the second resource set according to the configuration information carried in the first-type CSI-RS configuration signaling and the configuration information carried in the second-type CSI-RS configuration signaling.

Mode D.3

A configuration bitmap is used to indicate positions of 2-tuples of RBs and antenna ports corresponding to resources in the second resource set.

Each bit in the configuration bitmap is in one-to-one correspondence to each possible 2-tuple of RBs (or RB sets) and antenna ports (or antenna port sets) where resources in the second resource set may be distributed.

For example, a bit set to "1" (or set to "0") in the configuration bitmap indicates that the resources in the second resource set are distributed in the 2-tuple of RBs (or RB sets) and antenna ports (or antenna port sets) where the resources in the first resource set are distributed, in the 2-tuples of RBs (or RB sets) and antenna ports (or antenna port sets) corresponding to the bit; or conversely, a bit set to "0" or (set to "1") indicates that the resources in the second resource set are not distributed in the 2-tuple of RBs (or RB sets) and antenna ports (or antenna port sets) where the resources in the first resource set are distributed, in the 2-tuples of RBs (or RB sets) and antenna ports (or antenna port sets) corresponding to the bit.

Mode D.4

For example, antenna ports corresponding to different RBs (or different RB sets) and corresponding to the resources in the second resource set are different subsets of antenna ports corresponding to the resources in the first resource set, or RBs where resources in the second resource set are distributed, corresponding to different antenna ports (or different antenna port sets), are different subsets of RBs where resources in the first resource set are distributed.

Specifically, RBs where the resources in the second resource set are distributed and antenna ports corresponding to the resources in the second resource set meet $(n_{RB} - n_{port} - Q) \mod P = 0$, where P is a positive integer, and the value of Q is $\{0, 1, \ldots, P-1\}$. The base station may perform joint encoding for P and Q, and notify the joint encoding result of P and Q to the UE (through second-type CSI-RS configuration signaling); or may fix Q to 0 or other values (that is, Q is the default value), and notify only P to the UE; or may fix P to a constant (that is, P is a default value), and notify only Q to the UE (through second-type CSI-RS configuration signaling).

Further, adjacent RBs where resources in the second resource set are distributed may be away from the antenna ports corresponding to the resources in the second resource set as far as possible, that is, $|n_{port}(r_1)-n_{port}(r_2)|$ is as large as possible, where $|X|$ indicates the absolute value of X, $n_{port}(r_1)$ indicates the number of the antenna port, on the $r1^{th}$ RB, corresponding to the resource in the second resource set, $n_{port}(r_2)$ indicates the number of the antenna port, on the $r2^{th}$ RB, corresponding to the resource in the second resource set, and the $r1^{th}$ RB and $r2^{th}$ RB are adjacent RBs where resources in the second resource set are distributed. Specifically, assuming that the $r1^{th}$ RB, $r2^{th}$ RB, $r3^{th}$ RB and $r4^{th}$ RB are four adjacent RBs where resources in the second resource set are distributed, on the $r1^{th}$ RB, the antenna port corresponding to the resource in the second resource set is an antenna port meeting $(n_{port}-Q) \bmod P=0$; on the $r2^{th}$ RB, the antenna port corresponding to the resource in the second resource set is an antenna port meeting $(n_{port}-Q-P/2) \bmod P=0$; on the $r3^{th}$ RB, the antenna port corresponding to the resource in the second resource set is an antenna port meeting $(n_{port}-Q-P/4) \bmod P=0$; on the $r4^{th}$ RB, the antenna port corresponding to the resource in the second resource set is an antenna port meeting $(n_{port}-Q-3P/4) \bmod P=0$. The base station may perform joint encoding for P and Q, and notify the joint encoding result of P and Q to the UE (through second-type CSI-RS configuration signaling); or may fix Q to 0 or other values (that is, Q is the default value), and notify only P to the UE; or may fix P to a constant (that is, P is a default value), and notify only Q to the UE (through second-type CSI-RS configuration signaling).

E. Assuming that the second resource set is a subset of the first resource set in the time-space two-dimensional domain In this scenario, for example, a subframe is used as a mode of description of the time domain, an antenna port is used as a mode of description of the space domain, and a 2-tuple of RBs (or RB sets) and antenna ports (or antenna port sets) may be used as a mode of description of the time-space two-dimensional domain. Resources in the second resource set are distributed on a part of subframes corresponding to the first resource set, and antenna ports corresponding to the resources in the second resource set are a part of antenna ports corresponding to the first resource set; or antenna ports corresponding to different subframes (or different subframe sets) and corresponding to the resources in the second resource set are different subsets of the antenna ports corresponding to the resources in the first resource set, or subframes where resources in the second resource set are distributed, corresponding to different antenna ports (or different antenna port sets), are different subsets of subframes where resources in the first resource set are distributed.

The second-type CSI-RS configuration signaling transmitted by the base station to the UE may carry an indication of the positions of the subframes where resources in the second resource set are distributed and an indication of the positions of the antenna ports corresponding to the resources in the second resource set. The positions of the subframes where resources in the second resource set are distributed and positions of the antenna ports corresponding to the resources in the second resource set may be indicated in any one of the following modes:

Mode E.1

For example, mode A.1 or A.2 may be used to indicate the positions of the subframes where the resources in the second resource set are distributed, and mode C. 1 or C. 2 may be used to indicate the positions of the antenna ports corresponding to the resources in the second resource set.

Mode E.2

The subframes (or subframe sets) where the resources in the second resource set are distributed and the antenna ports (or antenna port sets) corresponding to the resources in the second resource set meet the following formula:

$$(n_{sf\_port}-Q) \bmod P=0,$$

where $n_{sf\_port}$ is a joint number of the 2-tuple of RBs (or RB sets) and antenna ports (or antenna port sets), where $$n_{sf\_port}=n_{sf} \times N_{port}+n_{port}, \text{ or}$$

$$n_{sf\_port}=n_{port} \times N_{sf}+n_{sf},$$

where: $N_{port}$ is the total number of antenna ports (or antenna port sets), $N_{sf}$ is the total number of subframes (or subframe sets), $n_{sf}$ is a subframe number or a subframe set number, and $n_{port}$ is an antenna port number (or antenna port set number), where one subframe set includes multiple subframes and one antenna port set may include multiple antenna ports. P indicates that in every P 2-tuples of subframes (or subframe sets) and antenna ports (antenna port sets) where the resources in the first resource set are distributed, there is one 2-tuple of subframes (or subframe sets) and antenna ports (or antenna port sets) where the resources in the second resource set are distributed; Q indicates that the resources in the second resource set are distributed in the $Q^{th}$ 2-tuple of subframes (or subframe sets) and antenna ports (or antenna port sets), in P 2-tuples of subframes (or subframe sets) and antenna ports (or antenna port sets) where the resources in the first resource set are distributed, where P is a positive integer and the value of Q is $\{0, 1, \ldots P-1\}$. The base station may perform joint encoding for P and Q, and notify the joint encoding result of P and Q to the UE (through second-type CSI-RS configuration signaling); or may fix Q to 0 or other values (that is, Q is a default value), and notify only P to the UE; or may fix P to a constant (that is, P is a default value), and notify only Q to the UE (through second-type CSI-RS configuration signaling). The UE may determine time-frequency positions of all REs in the second resource set according to the configuration information carried in the first-type CSI-RS configuration signaling and the configuration information carried in the second-type CSI-RS configuration signaling.

Mode E.3

A configuration bitmap is used to indicate positions of antenna ports corresponding to resources in the second resource set and indicate positions of subframes where resources in the second resource set are distributed.

Each bit in the configuration bitmap may be in one-to-one correspondence to each possible 2-tuple of subframes (or subframe sets) and antenna ports (or antenna port sets) where the resources in the second resource set may be distributed. For example, a bit set to "1" (or set to "0") in the configuration bitmap may indicate that the resources in the second resource set are distributed in the 2-tuple of subframes and antenna ports where the resources in the first resource set are distributed, in the 2-tuples of subframes (or subframe sets) and antenna ports (or antenna port sets) corresponding to the bit; or conversely, a bit set to "0" or (set to "1") indicates that the resources in the second resource set are not distributed in the 2-tuple of subframes (or subframe sets) and antenna ports (or antenna port sets) where the resources in the first resource set are distributed, in the 2-tuples of subframes (or subframe sets) and antenna ports (or antenna port sets) corresponding to the bit.

Mode E.4

For example, antenna ports corresponding to different subframes (or different subframe sets) and corresponding to the resources in the second resource set are different subsets of antenna ports corresponding to the resources in the first resource set, or subframes where the resources in the second resource set are distributed, corresponding to different antenna ports (or different antenna port sets), are different subsets of subframes where resources in the first resource set are distributed.

Specifically, the subframes where the resources in the second resource set are distributed and the antenna ports corresponding to the resources in the second resource set meet $(n_{RB}-n_{port}-Q)$ mod P=0, where P is a positive integer and the value of Q is $\{0, 1, \ldots, P-1\}$. The base station may perform joint encoding for P and Q, and notify the joint encoding result of P and Q to the UE (through second-type CSI-RS configuration signaling); or may fix Q to 0 or other values (that is, Q is the default value), and notify only P to the UE; or may fix P to a constant (that is, P is a default value), and notify only Q to the UE (through second-type CSI-RS configuration signaling).

Further, adjacent subframes where resources in the second resource set are distributed may be away from the antenna ports corresponding to the resources in the second resource set as far as possible, that is, $|n_{port}(s_1)-n_{port}(s_2)|$ is as large as possible, where $n_{port}(s_1)$ indicates the number of the antenna port, on the $s1^{th}$ subframe, corresponding to the resource in the second resource set, and $n_{port}(s_2)$ indicates the number of the antenna port, on the $s2^{th}$ subframe, corresponding to the resource in the second resource set, and the $s1^{th}$ subframe and $s2^{th}$ subframe are adjacent subframes where resources in the second resource set are distributed. Specifically, assuming that the $s1^{th}$ subframe, $s2^{th}$ subframe, $s3^{th}$ subframe, and $s4^{th}$ subframe are four adjacent subframes where resources in the second resource set are distributed, on the $s1^{th}$ subframe, the antenna port corresponding to the resource in the second, resource set is an antenna port meeting $(n_{port}-Q)$ mod P=0; on the $s2^{th}$ subframe, the antenna port corresponding to the resource in the second resource set is an antenna port meeting $(n_{port}-Q-P/2)$ mod P=0; on the $s3^{th}$ subframe, the antenna port corresponding to the resource in the second resource set is an antenna port meeting $(n_{port}-Q-P/4)$ mod P=0; on the $s4^{th}$ subframe, the antenna port corresponding to the resource in the second resource set is an antenna port meeting $(n_{port}-Q-3P/4)$ mod P=0. The base station may perform joint encoding for P and Q, and notify the joint encoding result of P and Q to the UE (through second-type CSI-RS configuration signaling); or may fix Q to 0 or other values (that is, Q is the default value), and notify only P to the UE; or may fix P to a constant (that is, P is a default value), and notify only Q to the UE (through second-type CSI-RS configuration signaling).

F. Assuming that the second resource set is a subset of the first resource set in the time-frequency two-dimensional domain In this scenario, for example, a subframe is used as a mode of description of the time domain, an RB is used as a mode of description of the space domain, and a 2-tuple of subframes (or subframe sets) and RBs (or RB sets) is used as a mode of description of the time-frequency two-dimensional domain.

The resources in the second resource set are distributed on a part of the subframes corresponding to the first resource set, and the resources in the second resource set are distributed on a part of the RBs corresponding to the first resource set. Or, corresponding to different subframes (or subframe sets), RBs where the resources in the second resource set are distributed are different subsets of the RBs where the resources in the first resource set are distributed, or, corresponding to different RBs (or RB sets), subframes where the resources in the second resource set are distributed are different subsets of the subframes where the resources in the first resource set are distributed.

The second-type CSI-RS configuration signaling transmitted by the base station to the UE may carry an indication of the positions of the subframes and positions of the RBs where the resources in the second resource set are distributed. The positions of the subframes and positions of the RBs where the resources in the second resource set are distributed may be indicated, for example, in any one of the following modes:

Mode F.1

For example, mode A.1 or A. 2 may be used to indicate the positions of the subframes where the resources in the second resource set are distributed, and mode B. 1 or B. 2 may be used to indicate the positions of the RBs where the resources in the second resource set are distributed.

Mode F.2

The subframes (or subframe sets) and RBs (or RB sets) where resources in the second resource set are distributed meet the following formula:

$$(n_{sf\_RB}-Q) \bmod P=0,$$

where $n_{sf\_RB}$ is a joint number of the 2-tuple of subframes (or subframe sets) and RBs (or RB sets), where $$n_{sf\_RB}=n_{sf} \times N_{RB}+n_{RB}, \text{ or}$$

$$n_{sf\_RB}=n_{RB} \times N_{sf}+n_{sf}.$$

where $N_{RB}$ is the total number of RBs or RB sets, $N_{sf}$ is the total number of subframes or subframe sets, $n_{sf}$ is a subframe number or a subframe set number, and $n_{RB}$ is an RB number or an RB set number, where one subframe set includes multiple subframes and one RB set may include multiple RBs. P indicates that in every P 2-tuples of subframes (or subframe sets) and RBs (or RB sets) where the resources in the first resource set are distributed, there is one 2-tuple of subframes (or subframe sets) and RBs (or RB sets) where the resources in the second resource set are distributed; Q indicates that the resources in the second resource set are distributed in the $Q^{th}$ 2-tuple of subframes (or subframe sets) and RBs (or RB sets), in P 2-tuples of subframes (or subframe sets) and RBs (or RB sets) where the resources in the first resource set are distributed, where P is a positive integer and the value of Q is $\{0, 1, \ldots P-1\}$. The base station may perform joint encoding for P and Q, and notify the joint encoding result of P and Q to the UE (through second-type CSI-RS configuration signaling); or may fix Q to 0 or other values (that is, Q is the default value), and notify only P to the UE; or may fix P to a constant (that is, P is a default value), and notify only Q to the UE (through second-type CSI-RS configuration signaling). The UE may determine time-frequency positions of all REs in the second resource set according to the configuration information carried in the first-type CSI-RS configuration signaling and the configuration information carried in the second-type CSI-RS configuration signaling.

Mode F.3

A configuration bitmap is used to indicate the positions of the subframes and RBs where the resources in the second resource set are distributed.

Each bit in the configuration bitmap may be in one-to-one correspondence to each possible 2-tuple of subframes (or subframe sets) and RBs (or RB sets) where the resources in the second resource set may be distributed. For example, a bit set to "1" (or set to "0") in the configuration bitmap indicates that the resources in the second resource are distributed in the subframes where the resources in the first resource set are distributed, in the 2-tuples of subframes (or subframe sets) and RBs (or RB sets) corresponding to the bit; or conversely, a bit set to "0" or (set to "1") indicates that the resources in the second resource set are not distributed in the subframes where the resources in the first resource set are distributed, in the 2-tuples of subframes (or subframe sets) and RBs (or RB sets) corresponding to the bit.

Mode F.4

For example, corresponding to different subframes (or subframe sets), RBs where the resources in the second resource set are distributed are different subsets of the RBs where the resources in the first resource set are distributed, or, corresponding to different RBs (or RB sets), subframes where the resources in the second resource set are different subsets of the subframes where the resources in the first resource set are distributed.

Specifically, the subframes and RBs where the resources in the second resource set are distributed meet $(n_{RB}-n_{sf}-Q)$ mod $P=0$, where P is a positive integer and the value of Q is $\{0, 1, \ldots P-1\}$. The base station may perform joint encoding for P and Q, and notify the joint encoding result of P and Q to the UE (through second-type CSI-RS configuration signaling); or may fix Q to 0 or other values (that is, Q is the default value), and notify only P to the UE; or may fix P to a constant (that is, P is a default value), and notify only Q to the UE (through second-type CSI-RS configuration signaling).

Further, adjacent subframes where resources in the second resource set are distributed may be away from the RBs of resources in the second resource set as far as possible, that is, $|n_{sf}(r_1)-n_{sf}(r_2)|$ is as large as possible, where: $n_{sf}(r_1)$ indicates the number of the subframe where the resources in the second resource set are distributed on the r1$^{th}$ RB, and $n_{sf}(r_2)$ indicates the number of the subframe where the resources in the second resource set are distributed on the r2$^{th}$ RB; the r1$^{th}$ RB and the r2$^{th}$ RB are two adjacent RBs where the resources in the second resource set are distributed. Specifically, assuming that the r1$^{th}$ RB, r2$^{th}$ RB, r3$^{th}$ RB, and r4$^{th}$ RB are four adjacent RBs where resources in the second resource set are distributed; on the r1$^{th}$ RB, the subframes where the resources in the second resource set are distributed are subframes meeting $(n_{port}-Q)$ mod $P=0$; on the r2$^{th}$ RB, the subframes where the resources in the second resource set are distributed are subframes meeting $(n_{port}-Q-P/2)$ mod $P=0$; on the r3$^{th}$ RB, the subframes where the resources in the second resource set are distributed are subframes meeting $(n_{port}-Q-P/4)$ mod $P=0$; on the r4$^{th}$ RB, the subframes where the resources in the second resource set are distributed are subframes meeting $(n_{port}-Q-3P/4)$ mod $P=0$. The base station may perform joint encoding for P and Q, and notify the joint encoding result of P and Q to the UE (through second-type CSI-RS configuration signaling); or may fix Q to 0 or other values (that is, Q is the default value), and notify only P to the UE; or may fix P to a constant (that is, P is a default value), and notify only Q to the UE (through second-type CSI-RS configuration signaling).

G. Assuming that the second resource set is a subset of the first resource set in the time-frequency-space three-dimensional domain In this scenario, a subframe may be used as a mode of description of the time domain; an RB may be used as a mode of description of the frequency domain; an antenna port may be used as a mode of description of the space domain; a 2-tuple of RBs (or RB sets) and antenna ports (or antenna port sets) may be used as a mode of description of the frequency-space two-dimensional domain; a 2-tuple of subframes (or subframe sets) and antenna ports (or antenna port sets) may be used as a mode of description of the time-space two-dimensional domain; a 3-tuple of subframes (or subframe sets) and RBs (or RB sets) and antenna ports (or antenna port sets) may be used as a mode of description of the time-frequency-space three-dimensional domain. The resources in the second resource set are distributed on a part of the subframes corresponding to the first resource set, and/or, the resources in the second resource set are distributed on a part of the RBs corresponding to the first resource set, and/or, the antenna ports corresponding to the resources in the second resource set are a part of the antenna ports corresponding to the first resource set.

The second-type CSI-RS configuration signaling transmitted by the base station to the UE may carry an indication of the positions of the subframes and positions of the RBs where the resources in the second resource set are distributed and an indication of positions of the antenna ports corresponding to the resources in the second resource set.

The positions of the subframes and positions of the RBs where the resources in the second resource set are distributed and the positions of the antenna ports corresponding to the resources in the second resource set may be indicated in any one of the following modes:

Mode G.1

For example, mode A.1 or A.2 may be used to indicate the positions of the subframes where the resources in the second resource set are distributed; mode B.1 or B.2 may be used to indicate the positions of the RBs where the resources in the second resource set are distributed; mode C.1 or C.2 may be used to indicate the positions of the antenna ports corresponding to the resources in the second resource set; mode D.1 or D.2 or D.3 may be used to indicate the position (namely, a 2-tuple of RBs and antenna ports (or RB sets and antenna port sets)) of the frequency-space two-dimensional domain corresponding to the resources in the second resource set; mode E.1 or E.2 or E.3 may be used to indicate the position (a 2-tuple of subframes and antenna ports (or subframe sets and antenna port sets)) of the time-space two-dimensional domain corresponding to the resources in the second resource set; mode F.1 or F.2 or F.3 may be used to indicate the position (namely, a 2-tuple of subframes and RBs (or subframe sets and RB sets)) of the time-frequency two-dimensional domain corresponding to the resources in the second resource set.

Mode G2

The subframes (or subframe sets) and RBs (or RB sets) where the resources in the second resource set are distributed and the antenna ports (or antenna port sets) corresponding to the resources in the second resource set may meet the following formula:

$$(n_{sf\_RB}-Q) \bmod P=0,$$

where $n_{sf\_RB\_port}$ is a joint number of the 3-tuple of subframes (or subframe sets) and RBs (or RB sets) and antenna ports (or antenna port sets), where $$n_{sf\_RB\_port}=n_{sf} \times N_{RB} \times N_{port}+n_{RB} \times N_{port}+n_{port},$$

where: $N_{port}$ is the total number of antenna ports or antenna port sets, $N_{RB}$ is the total number of RBs or RB sets, $n_{sf}$ is a subframe number or a subframe set number, $n_{RB}$ is an RB number or an RB set number, and $n_{port}$ is an antenna port number or an antenna port set number, where one subframe set includes multiple subframes, one RB set includes multiple RBs, and one antenna port set may include multiple antenna ports. P indicates that in every P 3-tuples of subframes (or subframe sets) and RBs (or RB sets) and antenna ports (or antenna port sets) where the resources in the first resource set are distributed, there is one 3-tuple of subframes (or subframe sets) and RBs (or RB sets) and antenna ports (or antenna port sets) where the resources in the second resource set are distributed; Q indicates that the resources in the second resource set are distributed in the $Q^{th}$ 3-tuple of subframes (or subframe sets) and RBs (or RB sets) and antenna ports (or antenna port sets), in P 3-tuples of subframes (or subframe sets) and RBs (or RB sets) and antenna ports (or antenna port sets) where the resources in the first resource set are distributed, where P is a positive integer and the value of Q is {0, 1, . . . P–1}. The base station may perform joint encoding for P and Q, and notify the joint encoding result of P and Q to the UE (through second-type CSI-RS configuration signaling); or may fix Q to 0 or other values (that is, Q is the default value), and notify only P to the UE; or may fix P to a constant (that is, P is a default value), and notify only Q to the UE (through second-type CSI-RS configuration signaling). The UE may determine time-frequency positions of all REs in the second resource set according to the configuration information carried in the first-type CSI-RS configuration signaling and the configuration information carried in the second-type CSI-RS configuration signaling.

Mode G3

A configuration bitmap is used to indicate positions of antenna ports corresponding to resources in the second resource set and indicate positions of subframes and RBs where the resources in the second resource set are distributed.

Each bit in the configuration bitmap may be in one-to-one correspondence to each possible 3-tuple of subframes (or subframe sets) and RBs (or RB sets) and antenna ports (or antenna port sets) where the resources in the second resource set may be distributed. For example, a bit set to "1" (or set to "0") in the configuration bitmap indicates that the resources in the second resource set are distributed in the 3-tuple of subframes (or subframe sets) and RBs (or RB sets) and antenna ports (or antenna port sets) where the resources in the first resource set are distributed, in the 3-tuples of subframes (or subframe sets) and RBs (or RB sets) and antenna ports (or antenna port sets) corresponding to the bit; or conversely, a bit set to "0" (or set to "1") indicates that the resources in the second resource set are not distributed in the 3-tuple of subframes (or subframe sets) and RBs (or RB sets) and antenna ports (or antenna port sets) where the resources in the first resource set are distributed, in the 3-tuples of subframes (or subframe sets) and RBs (or RB sets) and antenna ports (or antenna port sets) corresponding to the bit.

It is understandable that the scenario applicable to subframes, RBs, and antenna ports may also be similarly applicable to subframe sets, RB sets, and antenna port sets. For example, according to the specific scenario, a subframe number may be replaced with a subframe set number, an RB number may be replaced with an RB set number, and an antenna port number may be replaced with an antenna set number.

403. The node to be measured transmits a CSI-RS on a resource in the first resource set.

In actual applications, the node to be measured may transmit, for example, a zero-power CSI-RS or a non-zero-power CSI-RS on a resource in the first resource set. For example, the node to be measured may transmit a second CSI-RS sequence on a resource in the second resource set (for example, transmit a non-zero-power second CSI-RS sequence or a zero-power second CSI-RS sequence, where the transmitting a zero-power second CSI-RS sequence refers to not transmitting any signal), and transmit a first CSI-RS sequence on a resource in a complementary set of the second resource set (for example, transmit a zero-power first CSI-RS sequence or non-zero-power first CSI-RS sequence, where the transmitting a zero-power first CSI-RS sequence refers to not transmitting any signal), where the first CSI-RS sequence and the second CSI-RS sequence are the same or different CSI-RS sequences, and power for transmitting the first CSI-RS sequence and power for transmitting the second CSI-RS sequence by the node to be measured are the same or different. Or the node to be measured may transmit a third CSI-RS sequence on a resource in the first resource set. In this scenario, the node to be measured transmits, on the resource in the second resource set, a part of the third CSI-RS sequence. Definitely, power for transmitting, on the resource in the second resource set, the part of the CSI-RS sequence in the third CSI-RS sequence by the node to be measured, and power for transmitting, on the resource in the complementary set of the second resource set, another part of the CSI-RS sequence in the third CSI-RS sequence by the node to be measured may be the same or different. The complementary set of the second resource set refers to a complementary set of the second resource set in the first resource set.

In an application scenario, an interfering node (one or more interfering nodes) transmits an interference signal on a resource in the second resource set. The interfering node may notify that a resource element for transmitting the interference signal is a zero-power resource element, to a UE that may be served by the interfering node, so that the UE that may be served by the interfering node is further instructed not to receive data in a resource element position in which the interference signal is transmitted.

In addition, if there are multiple interfering nodes, in an optional implementation manner, interfering nodes or interfering node sets transmitting interference signals on different resources or resource subsets in the second resource set may be the same or different, or the interfering nodes transmit different interference signals on different resources or resource subsets in the second resource set, where a difference of the interference signals may refer to a difference of transmit power of the interference signals or a difference of data content of the interference signals.

The following uses an application scenario where node A, node B, and node C may participate in coordinated data transmission as an example for description.

Figure 7:
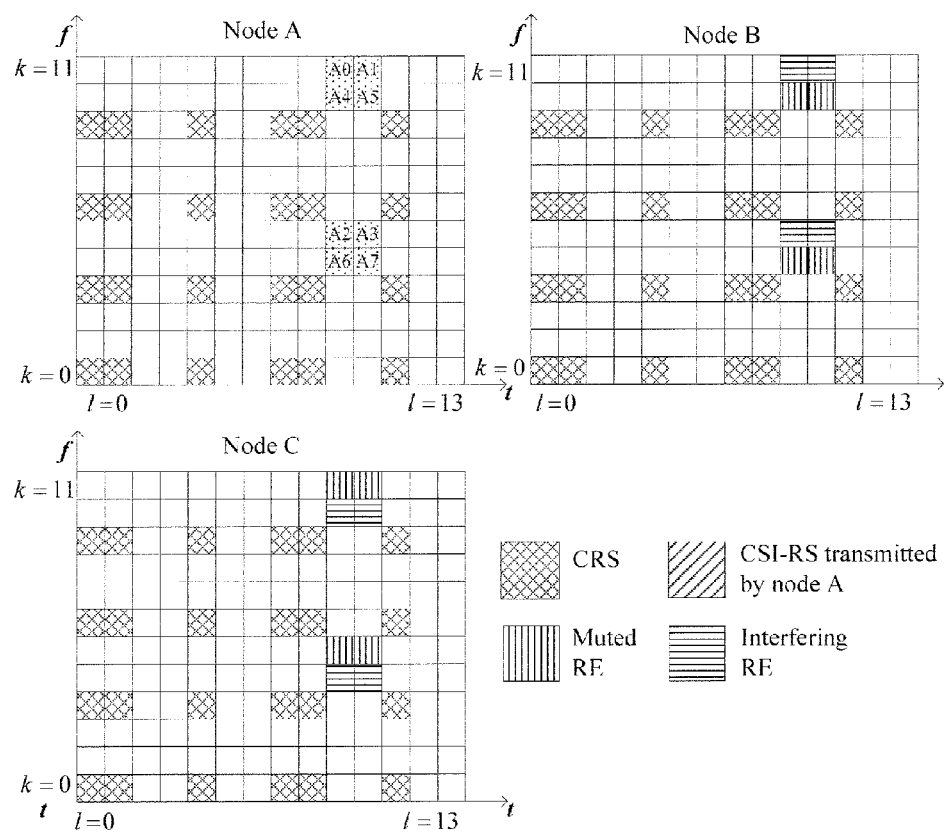
FIG. 7 is a schematic diagram of a multi-node CSI-RS configuration according to an embodiment of the present invention.

Referring to FIG. 7, it is assumed that, on node A, REs numbered {A0, A1 , A2, A3, A4, A5, A6, A7} belong to the first resource set, and that REs numbered {A0, A1} belong to the second resource set.

Node A transmits a CSI-RS on the REs numbered {A0, A1, A2, A3, A4, A5, A6, A7}.

Node A transmits, on the REs numbered {A0, A1}, a CSI-RS used for measuring interference of a node including node B and excluding node C; transmits, on the REs numbered {A2, A3}, a CSI-RS used for measuring interference of node B and node C; transmits, on the REs numbered {A4, A5}, a CSI-RS used for measuring interference of node C rather than node B; and transmits, on the REs numbered {A6, A7}, a CSI-RS used for measuring interference of neither node B nor node C.

Node B transmits an interference signal on REs numbered {A0, A1, A2, A3}, where the interference signal may be a random signal or a duplicated data signal or a duplicated CRS and so on. The transmit power of the interference signal may be obtained according to the data signal power and/or CRS power. For example, the transmit power of the interference signal is equal to the data signal power or CRS power, or is equal to the data signal power multiplied by factor 1 plus the CRS power multiplied by factor 2. The base station to which node B belongs adjusts transmit power of the interference signal of node B to control interference power that comes from node B and can be measured by the UE. The base station to which node B belongs to may notify the REs numbered {A0, A1, A2, A3, A4, A5, A6, A7}, which are used as a zero-power CSI-RS, to the UE that may be served by node B, so that the UE that may be served by node B is further instructed not to receive data in a resource element position in which the interference signal is transmitted.

Node C transmits an interference signal on REs numbered {A2, A3, A4, A5}, where the interference signal may be a random signal or a duplicated data signal or a duplicated CRS. The transmit power of the interference signal may be obtained according to the data signal power and/or CRS power. For example, the transmit power of the interference signal is equal to the data signal power or CRS power, or is equal to the data signal power multiplied by factor 1 plus the CRS power multiplied by factor 2. The base station to which node C belongs adjusts transmit power of the interference signal of node C to control interference power that comes from node C and can be measured by the UE. The base station to which node C belongs to may notify the REs numbered {A0, A1, A2, A3, A4, A5, A6, A7}, which are used as a zero-power CSI-RS, to the UE that may be served by node C, so that the UE that may be served by node C is further instructed not to receive data in a resource element position in which the interference signal is transmitted.

404. The UE performs an interference measurement in a resource position corresponding to the second resource set.

Further, the user equipment performs a channel measurement in the resource position corresponding to the first resource set or a third resource set, where the third resource set is a complementary set of the second resource set, or the third resource set is a subset of the first resource set and the third resource set and the second resource set have an intersection or do not have an intersection (where in this case, the base station may indicate, for example, the second resource set by using at least one piece of third-type CSI-RS configuration signaling).

405. Calculate a CQI according to a result of the interference measurement and a result of the channel measurement, and feed back the calculated CQI to the base station.

In an application scenario, the UE may respectively perform an interference measurement, for example, on the second resource set used for CSI-RS transmission, which is indicated by any one or more pieces of second-type CSI-RS configuration signaling in the at least one piece of second-type CSI-RS configuration signaling, and may respectively calculate a CQI corresponding to each piece of second-type CSI-RS configuration signaling or each second resource set, and feed back one or more CQIs to the base station. In this case, interference measured by the UE on each second resource set may be different, and the corresponding obtained CQI corresponds to different interference conditions, so that the UE can further calculate and feed back CQIs in different interference conditions.

The UE may further report a number of the second-type CSI-RS configuration signaling or a number of the second resource set corresponding to the one or more CQIs to the base station.

As can be seen from above, in the embodiment, a base station transmits at least one piece of first-type CSI-RS configuration signaling and at least one piece of second-type CSI-RS configuration signaling to a user equipment UE, where the at least one piece of first-type CSI-RS configuration signaling indicates a first resource set used for CSI-RS transmission; and a second resource set used for CSI-RS transmission, which is indicated by the at least one piece of second-type CSI-RS configuration signaling, is a subset of the first resource set; and the UE may perform an interference measurement on a resource in the second resource set. Based on this mechanism, resources included in the second resource set can be designed flexibly by the base station according to requirements, so that the UE can perform an interference measurement on a resource in the second resource set to measure interference as required. It can be seen that, the mechanism helps the UE to implement an interference measurement flexibly.

For better implementing the technical solutions of the embodiments of the present invention, the embodiments of the present invention further provide the related apparatus and system for implementing the above solutions.

Figure 8:
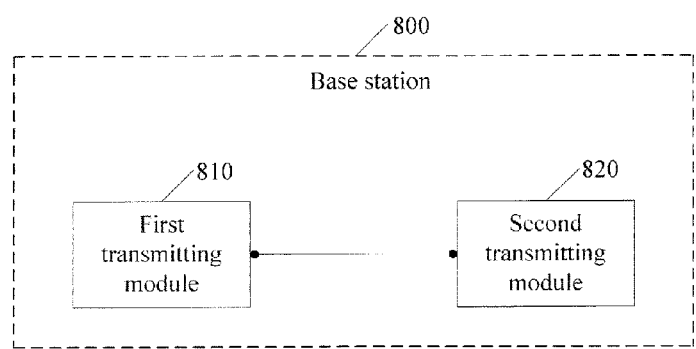
FIG. 8 is a schematic diagram of a base station according to an embodiment of the present invention.

Referring to FIG. 8, a base station 800 provided by an embodiment of the present invention may include:

a first transmitting module 810, configured to transmit at least one piece of first-type channel state information reference signal CSI-RS configuration signaling to a user equipment UE, where the at least one piece of first-type CSI-RS configuration signaling indicates a first resource set used for CSI-RS transmission; and a second transmitting module 820, configured to transmit at least one piece of second-type CSI-RS configuration signaling to the UE, where a second resource set used for CSI-RS transmission, which is indicated by the at least one piece of second-type CSI-RS configuration signaling, is a subset of the first resource set.

In an application scenario, the second resource set may be a subset of the first resource set in one or more domains. For example, the second resource set is a subset of the first resource set in a space domain; or the second resource set is a subset of the first resource set in a time domain; or the second resource set is a subset of the first resource set in a frequency domain; or the second resource set is a subset of the first resource set in a time-frequency two-dimensional domain; or the second resource set is a subset of the first resource set in a frequency-space two-dimensional domain; or the second resource set is a subset of the first resource set in a time-space two-dimensional domain; or the second resource set is a subset of the first resource set in a time-frequency-space three-dimensional domain.

For example, corresponding to different time and/or different frequencies, the second resource set may be different subsets of the first resource set in a space domain; or corresponding to different space and/or different frequencies, the second resource set may be different subsets of the first resource set in a time domain; or corresponding to different space and/or different time, the second resource set may be different subsets of the first resource set in a frequency domain; or corresponding to different space, the second resource set may be different subsets of the first resource set in a time-frequency two-dimensional domain; or corresponding to different time, the second resource set may be different subsets of the first resource set in a frequency-space two-dimensional domain; or corresponding to different frequencies, the second resource set may be different subsets of the first resource set in a time-space two-dimensional domain.

Correspondingly, the UE may receive the at least one piece of first-type CSI-RS configuration signaling (indicating the first resource set for CSI-RS transmission) transmitted by the base station, receive the at least one piece of second-type CSI-RS configuration signaling (indicating the second resource set used for CSI-RS transmission, which is a subset of the first resource set) transmitted by the base station, and perform an interference measurement in a resource position corresponding to the second resource set.

In actual applications, in order for the UE to quickly distinguish the first-type CSI-RS configuration signaling and second-type CSI-RS configuration signaling, the base station 800 may carry different message type identifiers in the first-type CSI-RS configuration signaling and the second-type CSI-RS configuration signaling, and accordingly the UE may determine, according to a message type identifier carried in the received CSI-RS configuration signaling, whether the message is the first-type CSI-RS configuration signaling or the second-type CSI-RS configuration signaling. Alternatively, the base station 800 may carry a message type identifier in the first-type CSI-RS configuration signaling or the second-type CSI-RS configuration signaling (for example, the base station may carry a message type identifier in the second-type CSI-RS configuration signaling), and in this case, the UE may determine, according to whether the received CSI-RS configuration signaling carries the message type identifier, whether the message is the first-type CSI-RS configuration signaling or the second-type CSI-RS configuration signaling. Definitely, the base station 800 may also not carry a message type identifier in the first-type CSI-RS configuration signaling and/or second-type CSI-RS configuration signaling, and accordingly the UE directly determines, according to relevant information carried in the received CSI-RS configuration signaling, whether the received CSI-RS configuration signaling is the first-type CSI-RS configuration signaling or the second-type CSI-RS configuration signaling.

In actual applications, the second-type CSI-RS configuration signaling transmitted by the second transmitting module 820 may include, for example, spacing information and/or offset information of resources in the second resource set relative to resources in the first resource set; or the second-type CSI-RS configuration signaling includes a configuration bitmap, where each bit in the configuration bitmap is in one-to-one correspondence to each resource or resource set that may belong to the second resource set. Definitely, the CSI-RS configuration signaling may also carry, for example, other indication information, so that the UE may determine the second resource set according to a combination of the received first-type CSI-RS configuration signaling and second-type CSI-RS configuration signaling. Definitely, the at least one piece of second-type CSI-RS configuration signaling may also independently indicate the second resource set, so that the UE may directly determine the second resource set according to the second-type CSI-RS configuration signaling.

In addition, a node to be measured may further transmit a CSI-RS (for example, transmit a zero-power CSI-RS or a non-zero-power CSI-RS) on a resource in the first resource set; and an interfering node may further transmit an interference signal on a resource in the second resource set. Further, the interfering node may notify that a resource element for transmitting the interference signal is a zero-power resource element, to a UE that may be served by the interfering node, so that the UE that may be served by the interfering node is further instructed not to receive data in a resource element position in which the interference signal is transmitted.

It is understandable that the base station 800 provided in this embodiment may be the base station in the foregoing method embodiments. The functions of each functional module of the base station 800 may be implemented according to the method provided in the foregoing method embodiments. The specific implementation process is not further described herein. For details, reference may be made to the related description in the foregoing method embodiments.

Figure 9:
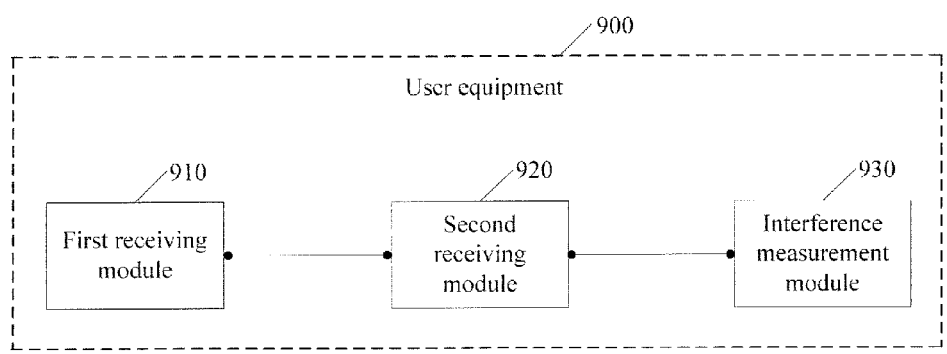
FIG. 9 is a schematic diagram of a user equipment according to an embodiment of the present invention.

Referring to FIG. 9, a user equipment 900 provided by an embodiment of the present invention may include:

a first receiving module 910, configured to receive at least one piece of first-type channel state information reference signal CSI-RS configuration signaling transmitted by a base station, where the at least one piece of first-type CSI-RS configuration signaling indicates a first resource set used for CSI-RS transmission;

a second receiving module 920, configured to receive at least one piece of second-type CSI-RS configuration signaling transmitted by the base station, where a second resource set used for CSI-RS transmission, which is indicated by the at least one piece of second-type CSI-RS configuration signaling, is a subset of the first resource set; and an interference measurement module 930, configured to perform an interference measurement in a resource position corresponding to the second resource set.

In an application scenario, the user equipment 900 may further include:

a channel measurement module, configured to perform a channel measurement in a resource position corresponding to the first resource set or a third resource set, where the third resource set is a complementary set of the second resource set in the first resource set, or the third resource set is a subset of the first resource set and the third resource set and the second resource set have an intersection or do not have an intersection; and a calculation and feedback module, configured to calculate a CQI according to a result of the interference measurement obtained by the interference measurement module 930 and a result of the channel measurement obtained by the channel measurement module, and feed back the CQI to the base station.

In an application scenario, the interference measurement module 930 may respectively perform an interference measurement, for example, on the second resource set used for CSI-RS transmission, which is indicated by any one or more pieces of second-type CSI-RS configuration signaling in the at least one piece of second-type CSI-RS configuration signaling, and the calculation and feedback module may respectively calculate a CQI corresponding to each piece of second-type CSI-RS configuration signaling or each second resource set, and feed back one or more CQIs to the base station.

In addition, the UE may report a number of the second-type CSI-RS configuration signaling or a number of the second resource set corresponding to the reported CQI to the base station.

It is understandable that the user equipment 900 provided in this embodiment may be the user equipment in the foregoing method embodiments. The functions of each functional module of the user equipment 900 may be implemented according to the method provided in the foregoing method embodiments. The specific implementation process is not further described herein. For details, reference may be made to the related description in the foregoing method embodiments.

An embodiment of the present invention further provides a communication system, which may include:

a base station 800 and/or a user equipment 900.

The communication system may further include one or more nodes to be measured, where, the node to be measured may transmit a zero-power CSI-RS or a non-zero-power CSI-RS on a resource in the first resource set.

The communication system may further include: one or more interfering nodes, which may be configured to transmit an interference signal on a resource in the second resource set. For example, the interfering node may transmit different interference signals on different resources or resource subsets in the second resource set; or there are multiple interfering nodes, where different interfering nodes or interfering node sets transmit interference signals on different resources or resource subsets in the second resource set.

In addition, a base station to which the interfering node belongs may notify that a resource element for transmitting the interference signal is a zero-power resource element, to a UE that may be served by the interfering node.

It should be noted that, for ease of description in the method embodiments above, the method is described as a series of actions. A person skilled in the art should be aware that the present invention is not limited by the order of the described actions, because some steps may occur in other orders or occur simultaneously according to the present invention. In addition, a person skilled in the art should know that the embodiments in the specification are exemplary embodiments and the involved actions and modules are not necessarily required for the present invention.

In the foregoing embodiments, the description of each embodiment has its own emphasis. For a part that is not described in detail in a certain embodiment, reference may be made to relevant description in other embodiments.

To sum up, in the embodiments of the present invention, a base station transmits at least one piece of first-type CSI-RS configuration signaling and at least one piece of second-type CSI-RS configuration signaling to a user equipment UE, where the at least one piece of first-type CSI-RS configuration signaling indicates a first resource set used for CSI-RS transmission; and a second resource set used for CSI-RS transmission, which is indicated by the at least one piece of second-type CSI-RS configuration signaling, is a subset of the first resource set. Based on this mechanism, resources included in the second resource set can be designed flexibly by the base station according to requirements, so that the UE can perform an interference measurement on a resource in the second resource set to measure interference as required. It can be seen that, the mechanism helps the UE to implement an interference measurement flexibly.

A person of ordinary skill in the art may understand that all or a part of the steps of the methods according to the embodiments may be implemented by a program instructing relevant hardware. The program may be stored in a computer readable storage medium, which may be a read only memory, a random access memory, a magnetic disk, or a CD-ROM.

An interference measurement indication method, an interference measurement method, a related device, and a communication system provided by the embodiments of the present invention are described in detail above. Although the principle and implementation manners of the present invention are described with reference to specific embodiments, the embodiments are only intended to help understand the method and core ideas of the present invention. Meanwhile, a person of ordinary skill in the art may make modifications to the specific implementation manners and application scopes according to the ideas of the present invention. To conclude, the content of the specification should not be construed as a limitation to the present invention.

What is claimed is:

1. An interference measurement indication method comprising:
    transmitting to a user equipment (UE), by a base station, first configuration information for a first-type channel state information reference signal (CSI-RS),
        wherein the first configuration information indicates a first resource set by carrying a bitmap for a zero-power CSI-RS, a period of the zero-power CSI-RS, and a subframe offset corresponding to the zero-power CSI-RS, and a resource in the first resource set is used for transmitting, by a node to be measured, the zero-power CSI-RS; and
    transmitting to the UE, by the base station, second configuration information for a second-type CSI-RS,
        wherein the second configuration information indicates a second resource set corresponding to a resource position used for interference measurement and the second resource set is a subset of the first resource set, and the second configuration information comprises: a configuration bitmap, wherein each bit in the configuration bitmap is in one-to-one correspondence to each resource or resource set that belongs to the second resource set.

2. The method according to claim 1, wherein:
    the second resource set is the subset of the first resource set in a space domain;
    or
    the second resource set is the subset of the first resource set in a time domain;
    or
    the second resource set is the subset of the first resource set in a frequency domain;
    or
    the second resource set is the subset of the first resource set in a time-frequency two-dimensional domain;
    or
    the second resource set is the subset of the first resource set in a frequency-space two-dimensional domain;
    or
    the second resource set is the subset of the first resource set in a time-space two-dimensional domain;
    or
    the second resource set is the subset of the first resource set in a time-frequency-space three-dimensional domain.

3. The method according to claim 1, further comprising:
    an interfering node transmitting an interference signal on a resource in the second resource set.

4. The method according to claim 3, wherein:
    the method further comprises:
    notifying, by the interfering node, that a resource element for transmitting the interference signal is a zero-power resource element, to another UE that is served by the interfering node.

5. The method according to claim 1, further comprising:
transmitting, by the interfering node, different interference signals on different resources or resource subsets in the second resource set.

6. An interference measurement method comprising:
receiving, by a user equipment, first configuration information for a first-type channel state information reference signal (CSI-RS) from a base station,
wherein the first configuration information indicates a first resource set by carrying a bitmap for a zero-power CSI-RS, a period of the zero-power CSI-RS and a subframe offset corresponding to the zero-power CSI-RS, and a resource in the first resource set is used for transmitting, by a node to be measured, the zero-power CSI-RS;
receiving, by the user equipment, second configuration information for a second-type CSI-RS from the base station,
wherein the second configuration information indicates a second resource set corresponding to a resource position used for interference measurement and the second resource set is a subset of the first resource set, and the second configuration information comprises: a configuration bitmap, wherein each bit in the configuration bitmap is in one-to-one correspondence to each resource or resource set that belongs to the second resource set; and
performing, by the user equipment, an interference measurement in a resource position corresponding to the second resource set.

7. The method according to claim 6, wherein:
the method further comprises:
performing, by the user equipment, a channel measurement in a resource position corresponding to the first resource set or a third resource set, wherein the third resource set is a complementary set of the second resource set in the first resource set, or the third resource set is a subset of the first resource set and the third resource set and the second resource set have an intersection or do not have an intersection; and
calculating a channel quality indicator (CQI) according to a result of the interference measurement and a result of the channel measurement, and feeding back the CQI to the base station.

8. The method according to claim 7, wherein:
the user equipment performs the interference measurement on the second resource set indicated by any one or more pieces of the second configuration information, calculates the CQI corresponding to the second information or the second resource set, and feeds back the CQI to the base station.

9. A base station, comprising:
a processor coupled to a non-transitory storage medium storing executable instructions, wherein the executable instructions, when executed by the processor, cause the base station to:
transmit first configuration information for a first-type channel state information reference signal (CSI-RS) to a user equipment (UE),
wherein the first configuration information indicates a first resource set by carrying a zero-power CSI-RS bitmap, a period of the zero-power CSI-RS and a subframe offset corresponding to the zero-power CSI-RS, and a resource in the first resource set is used for transmitting, by a node to be measured, the zero-power CSI-RS; and
transmit second configuration information for a second-type CSI-RS to the UE,
wherein the second configuration information indicates a second resource set corresponding to a resource position used for interference measurement and the second resource set is a subset of the first resource set, and the second configuration information comprises: a configuration bitmap, wherein each bit in the configuration bitmap is in one-to-one correspondence to each resource or resource set that belongs to the second resource set.

10. The base station according to claim 9, wherein:
the second resource set is the subset of the first resource set in a space domain;
or
the second resource set is the subset of the first resource set in a time domain;
or
the second resource set is the subset of the first resource set in a frequency domain;
or
the second resource set is the subset of the first resource set in a time-frequency two-dimensional domain;
or
the second resource set is the subset of the first resource set in a frequency-space two-dimensional domain;
or
the second resource set is the subset of the first resource set in a time-space two-dimensional domain;
or
the second resource set is the subset of the first resource set in a time-frequency-space three-dimensional domain.

11. A user equipment (UE) comprising:
a processor coupled to a non-transitory storage medium storing executable instructions, wherein the executable instructions, when executed by the processor, cause the UE to:
receive first configuration information for a first-type channel state information reference signal (CSI-RS) from a base station,
wherein the first configuration information indicates a first resource set by carrying a zero-power CSI-RS bitmap, a period of the zero-power CSI-RS and subframe offset corresponding to the zero-power CSI-RS, and a resource in the first resource set is used for transmitting, by a node to be measured, the zero-power CSI-RS;
receive second configuration information for a second-type CSI-RS from the base station,
wherein the second configuration information indicates a second resource set corresponding to a resource position used for interference measurement and the second resource set is a subset of the first resource set, and the second configuration information comprises: a configuration bitmap, wherein each bit in the configuration bitmap is in one-to-one correspondence to each resource or resource set that belongs to the second resource set; and
perform an interference measurement in a resource position corresponding to the second resource set.

12. The user equipment according to claim 11, wherein:
the executable instructions, when executed by the processor, cause the UE further to:
perform a channel measurement in a resource position corresponding to the first resource set or a third resource set, wherein the third resource set is a complementary set of the second resource set in the first resource set, or the third resource set is a subset of the first resource set and the third resource set and the second resource set have an intersection or do not have an intersection; and
calculate a channel quality indicator (CQI) according to a result of the interference measurement and a result of the channel measurement; and
feed back the CQI to the base station.

* * * * *